United States Patent
Khattak et al.

(10) Patent No.: US 12,541,943 B2
(45) Date of Patent: Feb. 3, 2026

(54) LANGUAGE MACHINE LEARNING MODEL FOR IMAGE RECOGNITION TASKS

(71) Applicant: Mohamed bin Zayed University of Artificial Intelligence, Abu Dhabi (AE)

(72) Inventors: Muhammad Uzair Khattak, Abu Dhabi (AE); Syed Talal Wasim, Abu Dhabi (AE); Muzammal Naseer, Abu Dhabi (AE); Salman Khan, Abu Dhabi (AE); Fahad Shahbaz Khan, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 255 days.

(21) Appl. No.: 18/541,666

(22) Filed: Dec. 15, 2023

(65) Prior Publication Data

US 2025/0200931 A1    Jun. 19, 2025

(51) Int. Cl.
  *G06V 10/44*    (2022.01)
  *G06T 7/11*    (2017.01)
  (Continued)

(52) U.S. Cl.
  CPC .............. *G06V 10/44* (2022.01); *G06T 7/11* (2017.01); *G06V 10/245* (2022.01); *G06V 10/764* (2022.01); *G06V 2201/07* (2022.01)

(58) Field of Classification Search
  CPC .... G06V 10/44; G06V 10/245; G06V 10/764; G06V 2201/07; G06V 10/82; G06T 7/11
  See application file for complete search history.

(56) References Cited

U.S. PATENT DOCUMENTS

| | | | |
|---|---|---|---|
| 2019/0266262 A1* | 8/2019 | He | ........................ G06N 3/0442 |
| 2023/0154188 A1 | 5/2023 | Li et al. | |
| 2023/0162481 A1* | 5/2023 | Yuan | ......................... G06T 9/00 |
| | | | 382/159 |

FOREIGN PATENT DOCUMENTS

CN      114973402 A      8/2022

OTHER PUBLICATIONS

Hao et al.; Dual Alignment Unsupervised Domain Adaptation for Video-Text Retrieval; Computer Vision Foundations; 2023; 11 Pages.

(Continued)

*Primary Examiner* — Mekonen T Bekele
(74) *Attorney, Agent, or Firm* — Oblon, McClelland, Maier & Neustadt, L.L.P.

(57) ABSTRACT

A computer-readable storage medium and method for adapting a vision-language (VL) machine learning model from a pre-trained VL model. The pre-trained VL model includes a pre-trained image encoder and a pre-trained textual encoder. The method is applicable to few shot learning and training of learnable prompts. After feature extraction, a machine learning engine determines a cross-entropy loss from prompted image features and prompted textual features. The machine learning engine then determines a self-regularizing consistency loss from the prompted image features, pre-trained image features, the prompted textual features, and pre-trained textual features. The learnable text and image prompts are updated based on the cross-entropy loss in combination with the self-regularizing consistency loss. To preserve generalization for downstream tasks, the updating with the self-regularizing consistency loss is constrained to maximize mutual agreement between the prompted image and textual features and the pre-trained image and textual features.

20 Claims, 18 Drawing Sheets

(51) Int. Cl.
*G06V 10/24* (2022.01)
*G06V 10/764* (2022.01)

(56) References Cited

OTHER PUBLICATIONS

Liu et al.; Prompt Learning with Cross-Modal Feature Alignment for Visual Domain Adaptation; CICAI 2022: Artificial Intelligence; Dec. 17, 2022; 12 Pages.

Qi et al.; Contrast with Reconstruct: Contrastive 3D Representation Learning Guided by Generative Pretraining; Proceeding of the 40th International Conferences on Machine Learning, PMLR 202; 2023; 21 Pages.

* cited by examiner

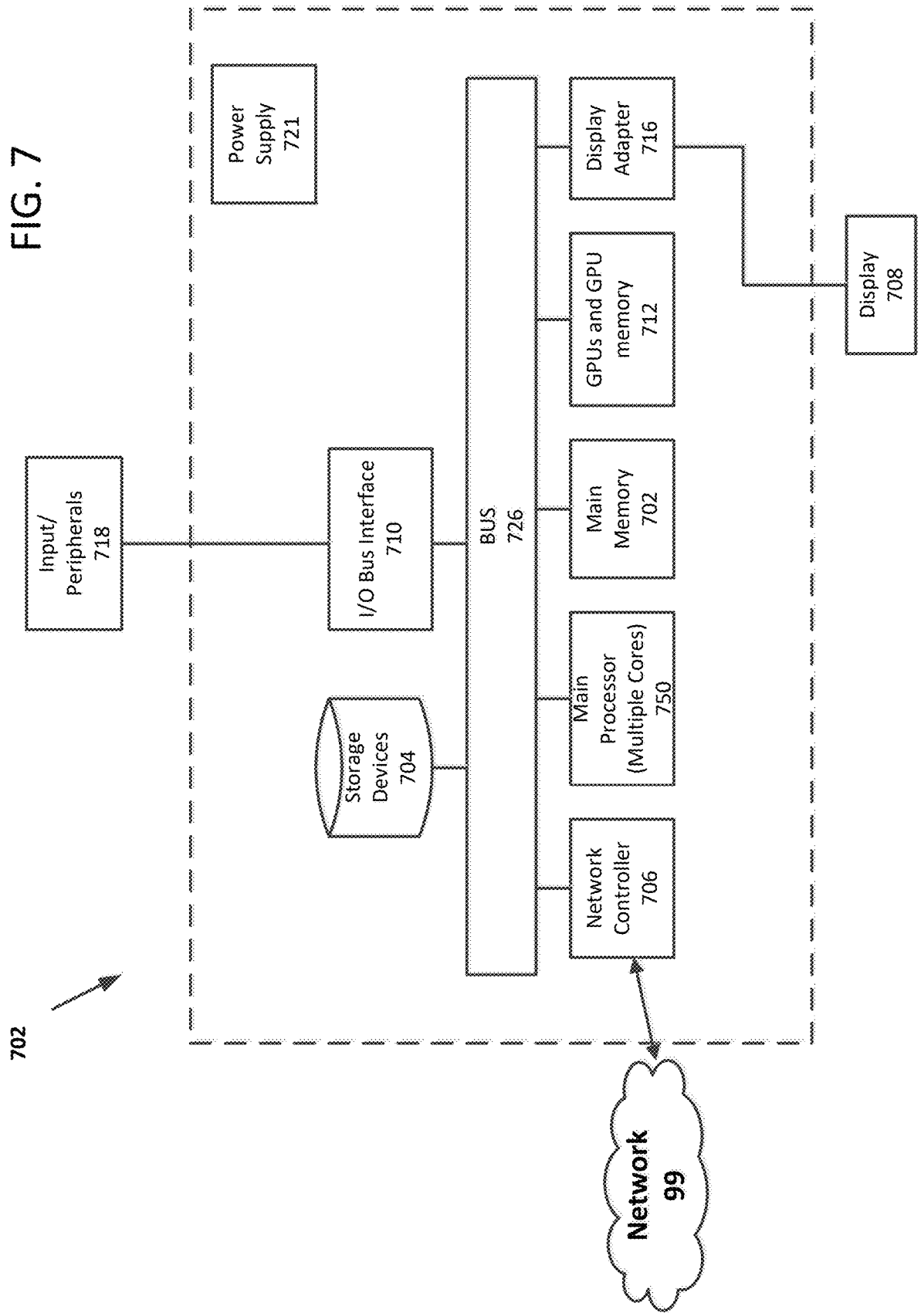

LANGUAGE MACHINE LEARNING MODEL FOR IMAGE RECOGNITION TASKS

STATEMENT OF PRIOR DISCLOSURE BY AN INVENTOR

Aspects of the present disclosure are described in Khattak, Muhammad Uzair, Syed Talal Wasim, Muzammal Naseer, Salman Khan, Ming-Hsuan Yang, and Fahad Shahbaz Khan. "Self-regulating prompts: Foundational model adaptation without forgetting."In *Proceedings of the IEEE/CVF International Conference on Computer Vision*, pp. 15190-15200. 2023 (arxiv.org/abs/2307.06948), and is herein incorporated by reference in its entirety.

BACKGROUND

Technical Field

The present disclosure relates to a system and method of training a vision-language machine learning model, in particular prompt learning with self-regulating constraints for few-shot learning of image recognition tasks.

Description of Related Art

Image recognition tasks can be performed using machine learning models. A machine learning model can be trained with as few as 100 images, or as many as several thousand images, depending on the level of accuracy. This quantity of images is for a single class. A training dataset, called ImageNet, consists of 1000 classes. Each class contains around 1300 training images and 50,000 test images in total. However, many real world cases are often without even 100 image samples for a class. For example, in the case of medical image recognition, there may be just a handful of images for a particular disease condition. In the case of machine vision for a vehicle, even images of outdoor environments may encounter so many different scenes that very few images relate to any single image class. Images of wildlife may be difficult to obtain much more than a dozen or so images of certain wild animals. Furthermore; even those images that have been obtained for certain objects may not be annotated with labels for the object. Thus, there is a strong need to create an image recognition machine learning model for recognition of rare images.

A technique for learning based on a few images of a class of objects is known as few-shot object detection. Few-shot object detection aims to generalize on novel objects using limited supervision and annotated samples. In particular, few-shot learning means N-way-K-Shot-classification, where N stands for the number of classes, and K for the number of samples from each class. The number of samples K is typically on the order of 2 to 3 samples or up to about 20 samples for a class.

Techniques have been developed for learning to augment unlabeled images. One such technique is contrastive learning. Contrastive learning focuses on the representation of features by comparing between different samples. Contrastive learning is a machine learning technique used to learn the general features of a dataset without labels by teaching the model which data samples are similar or different. In other words, contrastive learning looks at which pairs of data samples are "similar" and "different" in order to learn higher-level features about the data, before even performing a task such as classification or segmentation. Later performed tasks such as classification and segmentation are referred to as downstream tasks.

Vision Language models: Foundational vision-language (VL) models leverage both visual and textual modalities to encode rich multi-modal representations. See Radford et al; Chao Jia et al.; Xiaohua Zhai, Xiao Wang, Basil Mustafa, Andreas Steiner, Daniel Keysers, Alexander Kolesnikov, and Lucas Beyer. Lit: Zero-shot transfer with locked-image text tuning. In *CVPR*, pages 18123-18133, 2022; Lewei Yao, Runhui Huang, Lu Hou, Guansong Lu, Minzhe Niu, Hang Xu, Xiaodan Liang, Zhenguo Li, Xin Jiang, and Chunjing Xu. Filip: Fine-grained interactive language-image pre-training. *arXiv preprint arXiv:* 2111.07783, 2021; and Lu Yuan, Dongdong Chen, Yi-Ling Chen, Noel Codella, Xiyang Dai, Jianfeng Gao, Houdong Hu, Xuedong Huang, Boxin Li, Chunyuan Li, et al. Florence: A new foundation model for computer vision. *arXiv preprint arXiv:* 2111.11432, 2021. These multi-modal models are pre-trained on a large corpus of image-text pairs available on the Internet in a self-supervised manner. For instance, CLIP and ALIGN utilize around 400M and 1B image-text pairs, respectively, to train their multi-modal networks. During pre-training, contrastive loss is commonly used as a self-supervision loss. This loss pulls together the features of paired images and texts while pushing away the unpaired image-text features. VL models possess a strong understanding of open-vocabulary concepts, making them suitable for various downstream vision and vision-language applications. See Peng Gao, Shijie Geng, Renrui Zhang, Teli Ma, Rongyao Fang, Yongfeng Zhang, Hongsheng Li, and Yu Qiao. Clip-adapter: Better vision-language models with feature adapters. *arXiv preprint arXiv:* 2110.04544, 2021; Renrui Zhang, Rongyao Fang, Peng Gao, Wei Zhang, Kunchang Li, Jifeng Dai, Yu Qiao, and Hongsheng Li. Tip-adapter: Training-free clip-adapter for better vision-language modeling. In *ECCV*, 2022; Hanoona Rasheed, Muhammad Maaz, Muhammad Uzair Khattak, Salman Khan, and Fahad Shahbaz Khan: Bridging the gap between object and image-level representations for open-vocabulary detection. In *NeurIPS*, 2022; Muhammad Maaz, Hanoona Rasheed, Salman Khan, Fahad Shahbaz Khan, Rao Muhammad Anwer, and Ming-Hsuan Yang. Class-agnostic object detection with multi-modal transformer. In *ECCV*. Springer, 2022; Xingyi Zhou, Rohit Girdhar, Armand Joulin, Philipp Krähenbühl, and Ishan Misra. Detecting twenty-thousand classes using image-level supervision. In *ECCV*, 2022; Xiuye Gu, Tsung-Yi Lin, Weicheng Kuo, and Yin Cui. Open-vocabulary object detection via vision and language knowledge distillation. *arXiv preprint arXiv:* 2104.13921, 2021; Muhammad Arslan Manzoor, Sarah Albarri, Ziting Xian, Zaiqiao Meng, Preslav Nakov, and Shangsong Liang. Multimodality representation learning: A survey on evolution, pretraining and its applications. *arXiv preprint arXiv:* 2302.00389, 2023; Yuhang Zang, Wei Li, Kaiyang Zhou, Chen Huang, and Chen Change Loy. Open-vocabulary detr with conditional matching. In *ECCV*, 2022; Boyi Li, Kilian Q Weinberger, Serge Belongie, Vladlen Koltun, and Rene Ranftl. Language-driven semantic segmentation. In ICLR, 2022; Yongming Rao, Wenliang Zhao, Guangyi Chen, Yansong Tang, Zheng Zhu, Guan Huang, Jie Zhou, and Jiwen Lu. Denseclip: Language-guided dense prediction with context-aware prompting. In *CVPR*, pages 18082-18091, 2022; and Jian Ding, Nan Xue, Gui-Song Xia, and Dengxin Dai. Decoupling zero-shot semantic segmentation. In *CVPR*, pages 11583-11592, 2022. However, transferring these foundational models for downstream tasks without compromising on their original generalization ability remains a major challenge.

As mentioned above, CLIP is a vision-language model and is an example of a machine learning model that uses contrastive learning. CLIP performs contrastive learning by computing the similarity between text and image embeddings using textual and visual encoders. CLIP trains a text and image encoder during pretraining to learn the image-text pairs. It subsequently estimates the best caption (label) for the given input image. ALIGN is another example that uses image and textual encoders to minimize the distance between similar embeddings using a contrastive loss function. It follows a three-step process to enable zero-shot predictions.

Vision-Language (VL) models, such as CLIP and ALIGN, have demonstrated remarkable generalization capabilities for downstream tasks. See Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. In *ICML*, pages 8748-8763. PMLR, 2021; and Chao Jia, Yinfei Yang, Ye Xia, Yi-Ting Chen, Zarana Parekh, Hieu Pham, Quoc Le, Yun-Hsuan Sung, Zhen Li, and Tom Duerig. Scaling up visual and vision-language representation learning with noisy text supervision. In/CML, pages 4904-4916. PMLR, 2021. The resulting VL model is suited for downstream tasks such as open-vocabulary image recognition, object detection, and image-segmentation. See Konwoo Kim, Michael Laskin, Igor Mordatch, and Deepak Pathak. How to adapt your large-scale vision-and-language model, 2022; Chengjian Feng, Yujie Zhong, Zequn Jie, Xiangxiang Chu, Haibing Ren, Xiaolin Wei, Weidi Xie, and Lin Ma. Promptdet: Towards open-vocabulary detection using uncurated images. In *ECCV*, 2022; and Timo Lüddecke and Alexander Ecker. Image segmentation using text and image prompts. In *CVPR*, pages 7086-7096, 2022.

Prompt learning: Prompt learning is an alternative fine-tuning method for transferring a model towards downstream tasks without re-learning the trained model parameters. This approach adapts a pre-trained model by adding a small number of new learnable embeddings at the input known as prompt tokens. Prompt tokens are numeric representations of words or parts of words. Numbers are used for tokens rather than words or sentences because they can be processed more efficiently. Due to its efficiency in terms of parameters and convergence rate, prompt learning is found to be of great interest for adapting foundational models like CLIP for vision and vision-language tasks. See Menglin Jia, Luming Tang, Bor-Chun Chen, Claire Cardie, Serge Belongie, Bharath Hariharan, and Ser-Nam Lim. Visual prompt tuning. In *ECCV*, 2022; Yuanhan Zhang, Kaiyang Zhou, and Ziwei Liu. Neural prompt search. *arXiv preprint arXiv: 2206.04673*, 2022; Zifeng Wang, Zizhao Zhang, Sayna Ebrahimi, Ruoxi Sun, Han Zhang, Chen-Yu Lee, Xiaoqi Ren, Guolong Su, Vincent Perot, Jennifer Dy, et al. Dualprompt: Complementary prompting for rehearsal-free continual learning. In *ECCV*, 2022; Zifeng Wang, Zizhao Zhang, Chen-Yu Lee, Han Zhang, Ruoxi Sun, Xiaoqi Ren, Guolong Su, Vincent Perot, Jennifer Dy, and Tomas Pfister. Learning to prompt for continual learning. In *CVPR*, pages 139-149, 2022; Beier Zhu, Yulei Niu, Yucheng Han, Yue Wu, and Hanwang Zhang. Prompt-aligned gradient for prompt tuning. *arXiv preprint arXiv: 2205.14865*, 2022; and Mohammad Mahdi Derakhshani, Enrique Sanchez, Adrian Bulat, Victor Guilherme Turrisi da Costa, Cees G M Snoek, Georgios Tzimiropoulos, and Brais Martinez. Variational prompt tuning improves generalization of vision-language models. *arXiv preprint arXiv: 2210.02390*, 2022, each incorporated herein by reference in their entirety. CoOp fine-tunes CLIP by optimizing a continuous set of prompt vectors in its language branch for few-shot image recognition. Visual prompt tuning can be performed on CLIP by learning prompts sets of prompts for learning different contextual representations. See Hyojin Bahng, Ali Jahanian, Swami Sankaranarayanan, and Phillip Isola. Visual prompting: Modifying pixel space to adapt pre-trained models. *arXiv preprint arXiv: 2203.17274*, 2022. CoCoOp highlights the overfitting problem of CoOp and proposes to condition prompts based on visual features for improved performance on generalization tasks. MaPLe proposes a multi-modal prompt learning approach by learning hierarchical prompts jointly at the vision and language branches of CLIP for better transfer. See Muhammad Uzair Khattak, Hanoona Rasheed, Muhammad Maaz, Salman Khan, and Fahad Shahbaz Khan. Maple: Multi-modal prompt learning. In *CVPR*, pages 19113-19122, 2023. See also Hanoona Rasheed, Muhammad Uzair Khattak, Muhammad Maaz, Salman Khan, and Fahad Shahbaz Khan. Fine-tuned clip models are efficient video learners. In *CVPR*, pages 6545-6554, 2023.

Prompt learning has been found to be a more efficient approach to fine-tuning large-scale models, as shown in some studies. See Kaiyang Zhou, Jingkang Yang, Chen Change Loy, and Ziwei Liu. Conditional prompt learning for vision-language models. In *CVPR*, pages 16816-16825, 2022; Kaiyang Zhou, Jingkang Yang, Chen Change Loy, and Ziwei Liu. Learning to prompt for vision-language models. *IJCV*, 130 (9): 2337-2348, 2022; Guangyi Chen, Weiran Yao, Xiangchen Song, Xinyue Li, Yongming Rao, and Kun Zhang. Prompt learning with optimal transport for vision-language models. *arXiv preprint arXiv: 2210.01253*, 2022; Tony Huang, Jack Chu, and Fangyun Wei. Unsupervised prompt learning for vision-language models. *arXiv preprint arXiv: 2204.03649*, 2022; Manli Shu, Weili Nie, De-An Huang, Zhiding Yu, Tom Goldstein, Anima Anandkumar, and Chaowei Xiao. Testtime prompt tuning for zero-shot generalization in vision-language models. *arXiv preprint arXiv: 2209.07511*, 2022; and Yuning Lu, Jianzhuang Liu, Yonggang Zhang, Yajing Liu, and Xinmei Tian. Prompt distribution learning. In *CVPR*, pages 5206-5215, 2022.

The prompt learning approach introduces a few learnable prompt vectors to adapt models like CLIP for downstream tasks while keeping the pre-trained model weights fixed. However, since the prompts are optimized with respect to the task-specific objective, such as the cross-entropy loss for ImageNet classification, the prompted model tends to overfit to the task-specific data distribution as the training progresses. See Jia Deng, Wei Dong, Richard Socher, Li-Jia Li, Kai Li, and Li Fei-Fei. Imagenet: A large-scale hierarchical image database. In *CVPR*, pages 248-255. IEEE, 2009. This overfitting can result in the prompted model losing the original generalization capability of the frozen CLIP model towards new tasks. In other words, prompts help to achieve better adaptation to a given task, but with reduced generalizability to new tasks. Also, it has been found that in early training epochs, prompt learning is not mature enough to capture contextual information. Further, each class only has a single textual label. Thus, imposing mutual agreement constraints on the multi-modal features of image and text pairs results in sub-optimal performance due to lack of diversity in text-side labels for a text encoder. Therefore, learning prompts that can model both task-specific and task-agnostic representations remain a major challenge for adapting foundational VL models such as CLIP and ALIGN.

Network regularization: Incorporating regularization techniques in neural networks has been proven to enhance their generalization capabilities. See Kyungmoon Lee, Sungyeon Kim, and Suha Kwak. Cross-domain ensemble distillation for domain generalization. In *ECCV*, pages 1-20. Springer, 2022. Regularization techniques can be broadly classified into two streams. The first stream consists of constraint-based regularization methods, such as weight decay and adversarial training. Decoupled weight decay regularization. *arXiv preprint arXiv:* 1711.05101, 2017; and Mingyang Yi, Lu Hou, Jiacheng Sun, Lifeng Shang, Xin Jiang, Qun Liu, and Zhiming Ma. Improved ood generalization via adversarial training and pretraing. In *ICML*, pages 11987-11997. PMLR, 2021. These techniques introduce additional constraints to the learning process, which helps to prevent overfitting.

The second stream of regularization techniques involves modifying the inputs, model parameters, or annotations. This category of regularization techniques includes methods such as data augmentations, dropout, model ensembling, label smoothing and batch normalization. See Sangdoo Yun, Dongyoon Han, Seong Joon Oh, Sanghyuk Chun, Junsuk Choe, and Youngjoon Yoo. Cutmix: Regularization strategy to train strong classifiers with localizable features. In *CVPR*, pages 6023-6032, 2019; Hongyi Zhang, Moustapha Cisse, Yann N Dauphin, and David Lopez-Paz. mixup: Beyond empirical risk minimization. *arXiv preprint arXiv:* 1710.09412, 2017; Ekin D Cubuk, Barret Zoph, Jonathon Shlens, and Quoc V Le. Randaugment: Practical automated data augmentation with a reduced search space. In *CVPR Workshop*, pages 702-703, 2020; Nitish Srivastava, Geoffrey Hinton, Alex Krizhevsky, Ilya Sutskever, and Ruslan Salakhutdinov. Dropout: a simple way to prevent neural networks from overfitting. *JMLR*, 15 (1): 1929-1958, 2014; Gabriel Ilharco, Mitchell Wortsman, Samir Yitzhak Gadre, Shuran Song, Hannaneh Hajishirzi, Simon Kornblith, Ali Farhadi, and Ludwig Schmidt. Patching open-vocabulary models by interpolating weights. *arXiv preprint arXiv:* 2208.05592, 2022; Mitchell Wortsman, Gabriel Ilharco, Jong Wook Kim, Mike Li, Simon Kornblith, Rebecca Roelofs, Raphael Gontijo Lopes, Hannaneh Hajishirzi, Ali Farhadi, Hongseok Namkoong, et al. Robust fine-tuning of zero-shot models. In *CVPR*, pages 7959-7971, 2022; Christian Szegedy, Vincent Vanhoucke, Sergey Ioffe, Jon Shlens, and Zbigniew Wojna. Rethinking the inception architecture for computer vision. In *CVPR*, pages 2818-2826, 2016; and Sergey Ioffe and Christian Szegedy. Batch normalization: Accelerating deep network training by reducing internal covariate shift. In *ICML*, pages 448-456. pmlr, 2015.

There is still a need to further enhance the generalization performance of learned prompts in the regularization techniques mentioned above. Accordingly, it is one object of the invention to provide a training method and system that can avoid prompt overfitting when adapting foundational VL models, A further object of the invention is to provide a method and system to train prompts in a manner that captures complementary features learned at different epochs during training in order to enhance generalization performance. A further object is to overcome the significant diversity mismatch between the text and visual domains.

SUMMARY

One aspect of the invention is method of training a vision-language machine learning model that includes generating prompted and pre-trained image features, and pre-trained textual features; then producing a diverse set of frozen VL textual features which are averaged to obtain pre-trained VL text features; Mutual Agreement Maximization are used to ensure that prompted features align with the pre-trained VL representations; then performing prompt self-ensembling to combine strengths of prompts learned at different epochs during training via Gaussian weighted sampling; and finally inferencing using ensembled visual and textual prompts.

In an embodiment the prompts are regulated in order to ensure that prompted features. align using a self-consistency loss that imposes a constraint on the prompted visual and text features to ensure their consistency with the pretrained VL features.

In an embodiment the Gaussian weighted sampling includes performing Gaussian weighted prompt aggregation (GPA), where small aggregation weights are given to prompts at initial epochs, higher weights to prompts at middle epochs, and relatively lower weights to prompts at final epochs, resulting in optimal prompt representations that improve generalization to downstream tasks.

In an embodiment the textual diversity is achieved using a pool of textual prompt templates, containing N augmentations to form multiple text features per category, in which the pre-trained textual features are obtained as an ensemble of multiple prompt templates.

In an embodiment the self-consistency loss includes a logit level self-consistency regularization and a condition of a prompted logits distribution on pre-trained logits. distribution.

An aspect is a method of adapting a vision-language (VL) machine learning model from a pre-trained VL model, the pre-trained VL model including a pre-trained image encoder and a pre-trained textual encoder; wherein the method is computer program implemented on a machine learning engine on which the pre-trained VL model is implemented, the method can include inputting a plurality of images for N image classes, where at least one class contains K image samples, where K is a number less than 20 and dividing each image into input image tokens; appending learnable text and image prompt tokens with input text tokens and the image input tokens, respectively, to obtain prompted text tokens and prompted image tokens; in parallel, generating from the prompted image tokens, via the pre-trained image encoder, prompted image features. and, via the pretrained textual encoder, prompted textual features from the prompted text tokens; determining, using the machine learning engine, a cross-entropy loss from the prompted image features and the prompted textual features; in parallel, generating from the input image tokens, via the pre-trained image encoder, pre-trained image features, and via the pre-trained text encoder, pre-trained textual features from the input text tokens; determining, using the machine learning engine, a self-regularizing consistency loss from the prompted image features, the pre-trained image features, the prompted textual features, and the pre-trained textual features; and updating the learnable text and image prompt tokens based on the cross-entropy loss in combination with the self-regularizing consistency loss, wherein the updating with the self-regularizing consistency loss is constrained to maximize mutual agreement between the prompted image and textual features and the pre-trained image and textual features.

A further aspect is a non-transitory computer-readable storage medium storing a pre-trained vision-language (VL) model, the pre-trained VL model including a pre-trained image encoder and a pre-trained textual encoder, the computer-readable storage medium including computer executable instructions, wherein the instructions, when executed by a machine learning (ML) engine, cause the ML engine to perform a method for adapting a VL machine learning model from the pre-trained VL model. The method can include inputting a plurality of images for N image classes, where at least one class contains K image samples, where K is a number less than 20 and dividing each image into input image tokens; appending learnable text and image prompt tokens with input text tokens and the image input tokens, respectively, to obtain prompted text tokens and prompted image tokens; in parallel, generating from the prompted image tokens, via the pre-trained image encoder, prompted image features. and, via the pretrained textual encoder, prompted textual features from the prompted text tokens; determining, using the machine learning engine, a cross-entropy loss from the prompted image features and the prompted textual features; in parallel, generating from the input image tokens, via the pre-trained image encoder, pre-trained image features, and via the pre-trained text encoder, pre-trained textual features from the input text tokens; determining, using the machine learning engine, a self-regularizing consistency loss from the prompted image features, the pre-trained image features, the prompted textual features, and the pre-trained textual features; and updating the learnable text and image prompt tokens based on the cross-entropy loss in combination with the self-regularizing consistency loss, wherein the updating with the self-regularizing consistency loss is constrained to maximize mutual agreement between the prompted image and textual features and the pre-trained image and textual. features.

The foregoing general description of the illustrative embodiments and the following detailed description thereof are merely exemplary aspects of the teachings of this disclosure and are not restrictive:

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a computer system diagram for machine learning;

DETAILED DESCRIPTION OF THE INVENTION

Figure 1A:
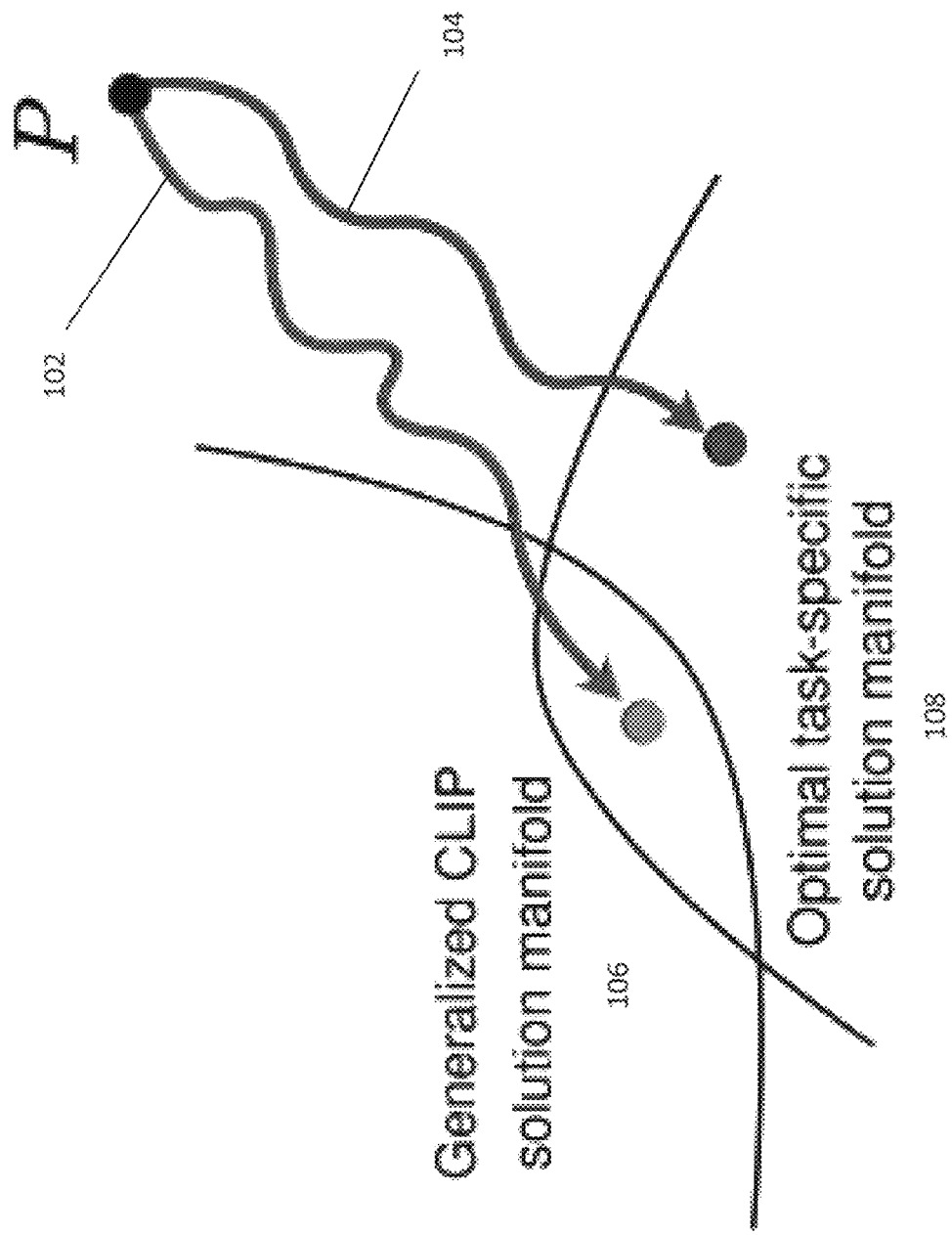
FIG. 1A is a graph that demonstrates the effectiveness of PromptSRC on four representative tasks.

In the drawings, like reference numerals designate identical or corresponding parts throughout the several views. Further, as used herein, the words "a," "an" and the like generally carry a meaning of "one or more," unless stated otherwise.

Aspects of this disclosure are directed to a regularization framework that adapts VL models via prompt learning. An aspect is an approach to fine-tuning of pre-trained VL models where prompts are learned at both the vision and language encoder. An aspect is to regularize prompts during adaptation by jointly attending to the original VL model feature space, the training trajectory of prompts as well as the diversity of textual inputs for the multi-modal models.

The disclosed framework for prompting, referred to as Prompting with Self-regulating Constraints (PromptSRC) seeks to self-regulate prompts to address the issue of prompt overfitting. The self-regularizing framework guides the prompts to jointly optimize for both task-specific and task-agnostic general representations using a three-pronged approach. a) Regulating via Mutual Agreement Maximization. b) Regulating with the Self-ensemble. c) Regulating with Textual Diversity.

Regarding Regulating via Mutual Agreement Maximization, it has been determined that generalizable zero-shot knowledge is preserved within frozen pre-trained VL model features but they lack task-specific knowledge. In contrast, prompts achieve better adaptation to a given task but with reduced generalizability to new tasks. As a solution, PromptSRC regulates learned prompts by maximizing the agreement between prompted and frozen VL model features while adapting them to the downstream task.

Regarding regulating with the self-ensemble, it has been determined that in the early epochs, prompts are not mature to capture contextual information. As the training progresses, prompts tend to become more task-specific. As a solution, PromptSRC deploys a weighted prompt aggregation technique to prompts during training to regulate them using their self-ensemble over the training phase. The weights are sampled from a Gaussian distribution which suitably aggregates the useful knowledge learned by prompts at different training epochs.

Regarding regulating with textual diversity, it has been found that unlike having multiple image samples per category for the vision encoder, there is only a single textual label available for each class. Therefore, imposing the mutual agreement constraints on multi-modal features results in sub-optimal performance due to the lack of diversity in text-side labels for the text encoder. To overcome this disparity, PromptSRC regulates the prompts through diverse text label templates for each class.

Figure 1B:
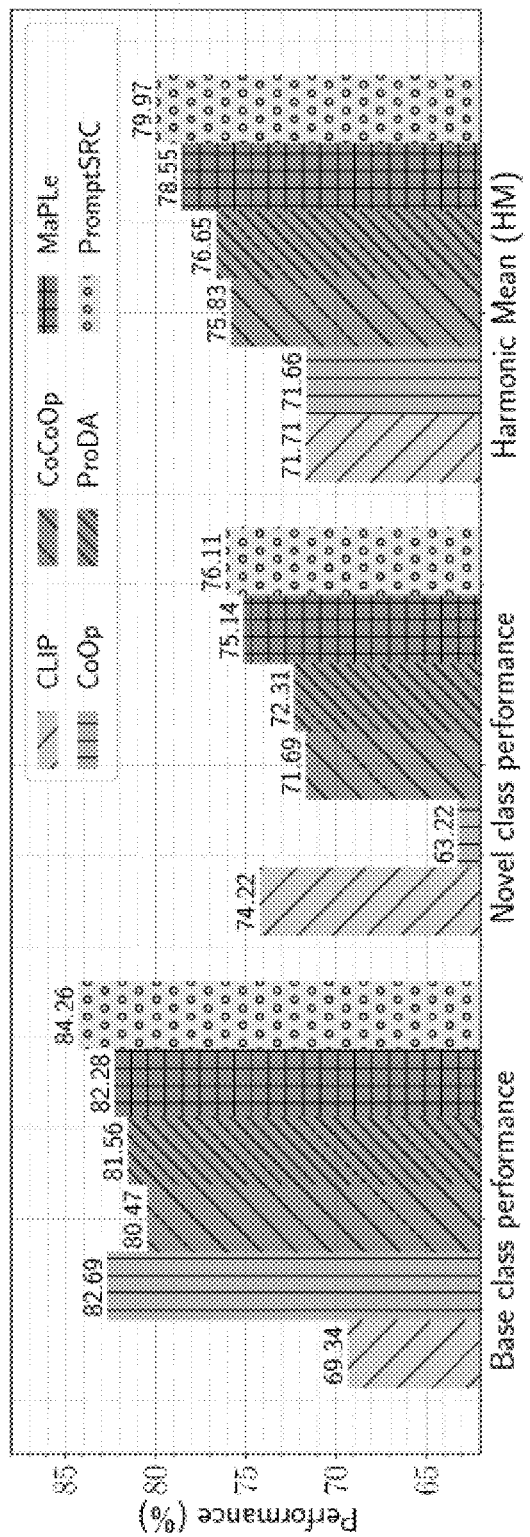
FIG. 1B are charts comparing class performance based on base class performance, novel class performance, and harmonic mean.
Figure 1C:
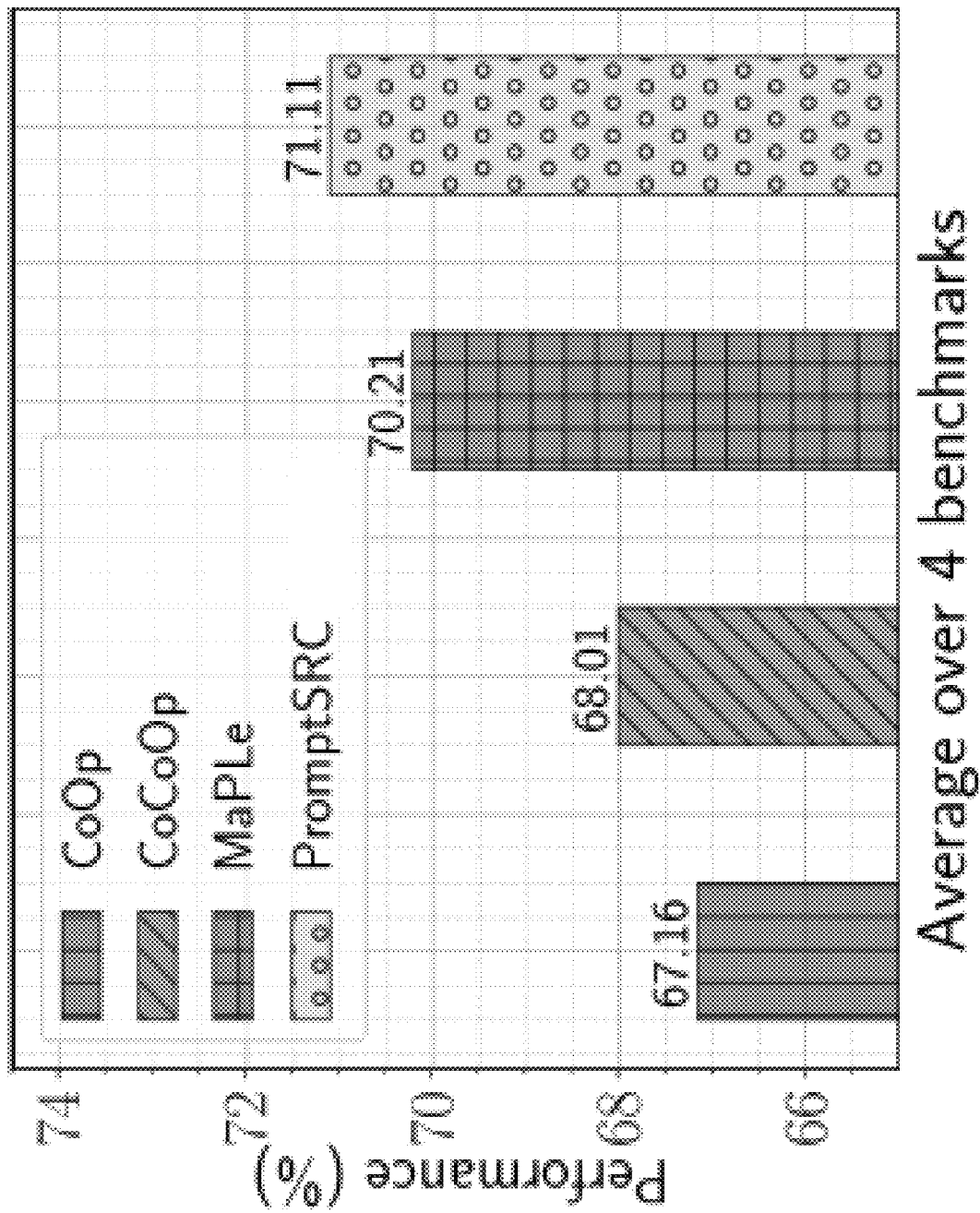
FIG. 1C is a chart comparing results over four diverse image recognition benchmarks.

FIG. 1A is a graph that demonstrates the effectiveness of PromptSRC on four representative tasks. FIG. 1B are charts comparing class performance based on base class performance, novel class performance, and harmonic mean. FIG. 1C is a chart comparing results over four diverse image recognition benchmarks.

PromptSRC explicitly steers prompts to learn a representation space that maximizes its performance on downstream tasks without compromising pre-trained VL model generalization. Regarding FIG. 1A, conventional prompt learning approaches rely on task-specific objectives that restrict prompt learning to learn a feature space suitable only for downstream tasks and consequently lose the generalized knowledge of pre-trained VL models, such as CLIP (104). The present self-regulating framework explicitly guides the training trajectory of prompts towards the closest point between two optimal solution manifolds (106, 108) to learn task-specific representations while also retaining generalized CLIP knowledge (102).

Regarding FIG. 1B, averaged across 11 image recognition datasets, PromptSRC surpasses existing methods on the base-to-novel generalization setting. The PromptSRC method achieves average gains of +1.42% in harmonic-mean over the state-of-the-art MaPLe and +8.26% over CLIP.

The effectiveness of PromptSRC is demonstrated on four representative tasks. Regarding FIG. 1C, PromptSRC achieves competitive results in cross-dataset transfer, domain generalization, and few-shot image recognition.

Regarding MaPLe, see Muhammad Uzair Khattak, Hanoona Rasheed, Muhammad Maaz, Salman Khan, and Fahad Shahbaz Khan. Maple: Multi-modal prompt learning. In *CVPR*, pages 19113-19122, 2023, incorporated herein by reference in its entirety.

PromptSRC Method

Prompt learning aims to adapt the general knowledge of VL foundational models like CLIP without full fine-tuning. See Zhou et al., *IJCV* (2022); Zhou et al., *CVPR* (2022); and Chen et al., each incorporated herein by reference in its entirety. Since prompts are the only learnable vectors, this strategy aims to retain the pretrained generalized feature representations of CLIP while re-purposing them for downstream task-specific data via prompts.

Figure 2:
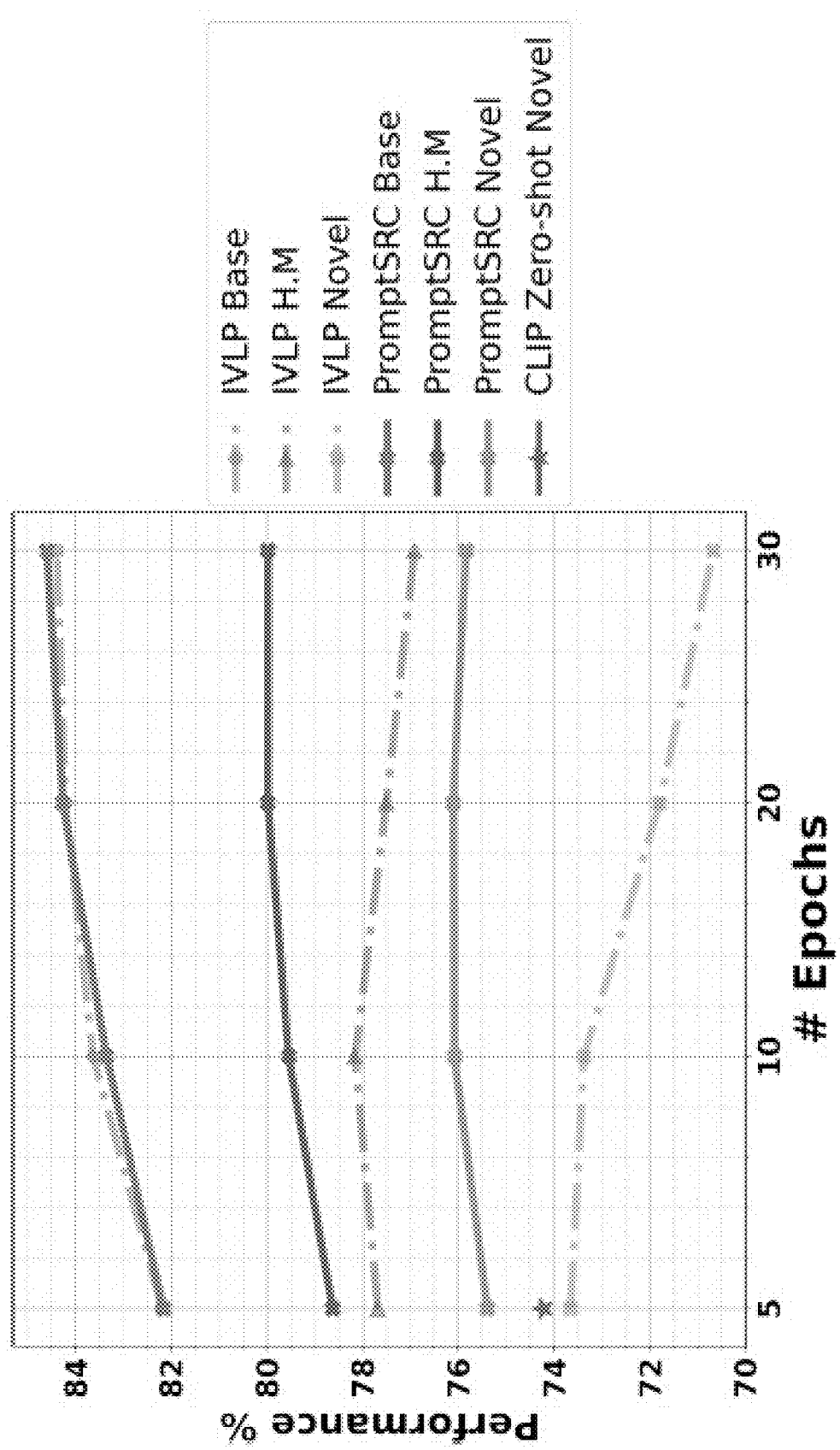
FIG. 2 is a graph of performance with respect to number of epochs.

As mentioned above, although effective, prompt learning is susceptible to overfitting on the supervised downstream task and the generalization towards new classes and datasets reduces as compared to the original zero-shot pre-trained CLIP. FIG. 2 is a graph of performance with respect to number of epochs. Regarding FIG. 2, naively training prompts with standard supervised objectives improves supervised class performance but leads to poor generalization as training schedule increases. The PromptSRC method with explicit prompts consistency constraints improves on base classes as well as shows improvements on novel classes.

The PromptSRC framework seeks to address the overfitting behavior of prompts. Conventional prompting approaches improve generalization mainly from the model architecture perspective. As evidenced by the strong zero-shot performance, pre-trained CLIP features possess robust generalization characteristics. However, in the case of adapting CLIP for specific tasks, naively training prompts with the supervised task-specific loss struggles to retain these general attributes from the frozen CLIP. To this end, the self-regularizing framework of the present disclosure explicitly guides the training trajectory of prompts to maximize its interaction with the pre-trained knowledge stored in the frozen CLIP.

Figure 3A:
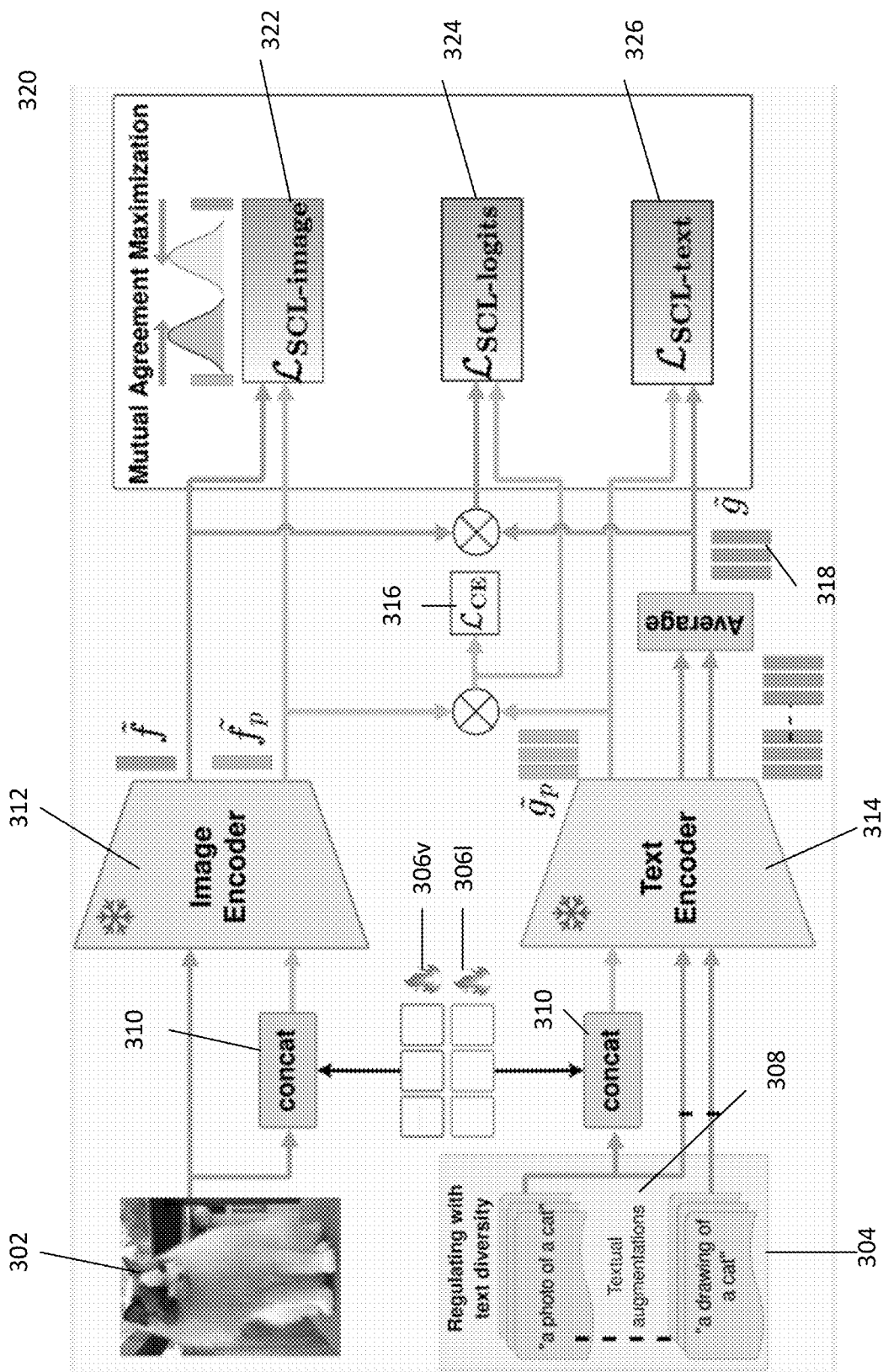
FIGS. 3A, 3B is a flow diagram of the PromptSRC framework, in accordance with exemplary aspects of the disclosure.
Figure 3B:
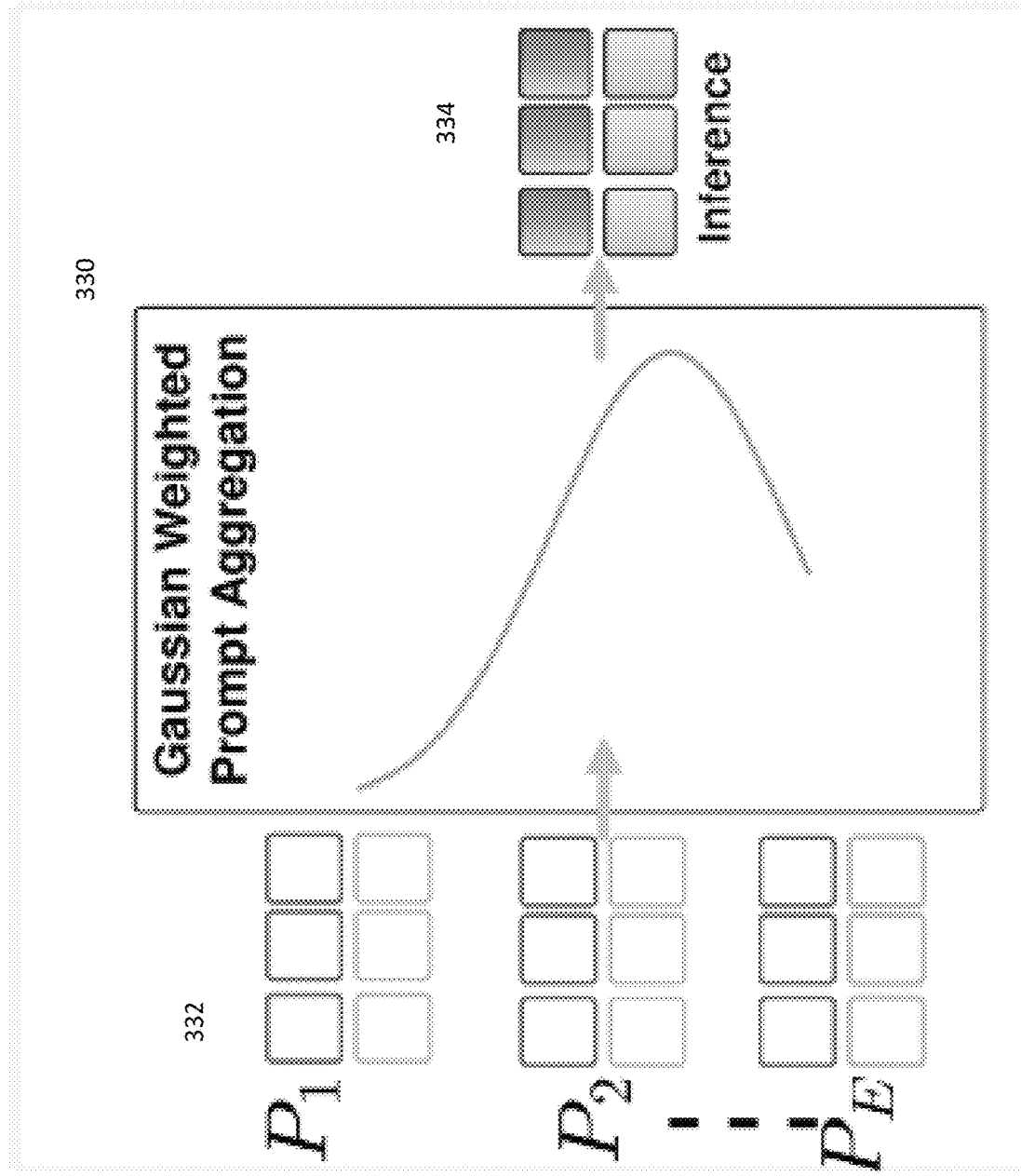
Figures 4A, 4B:
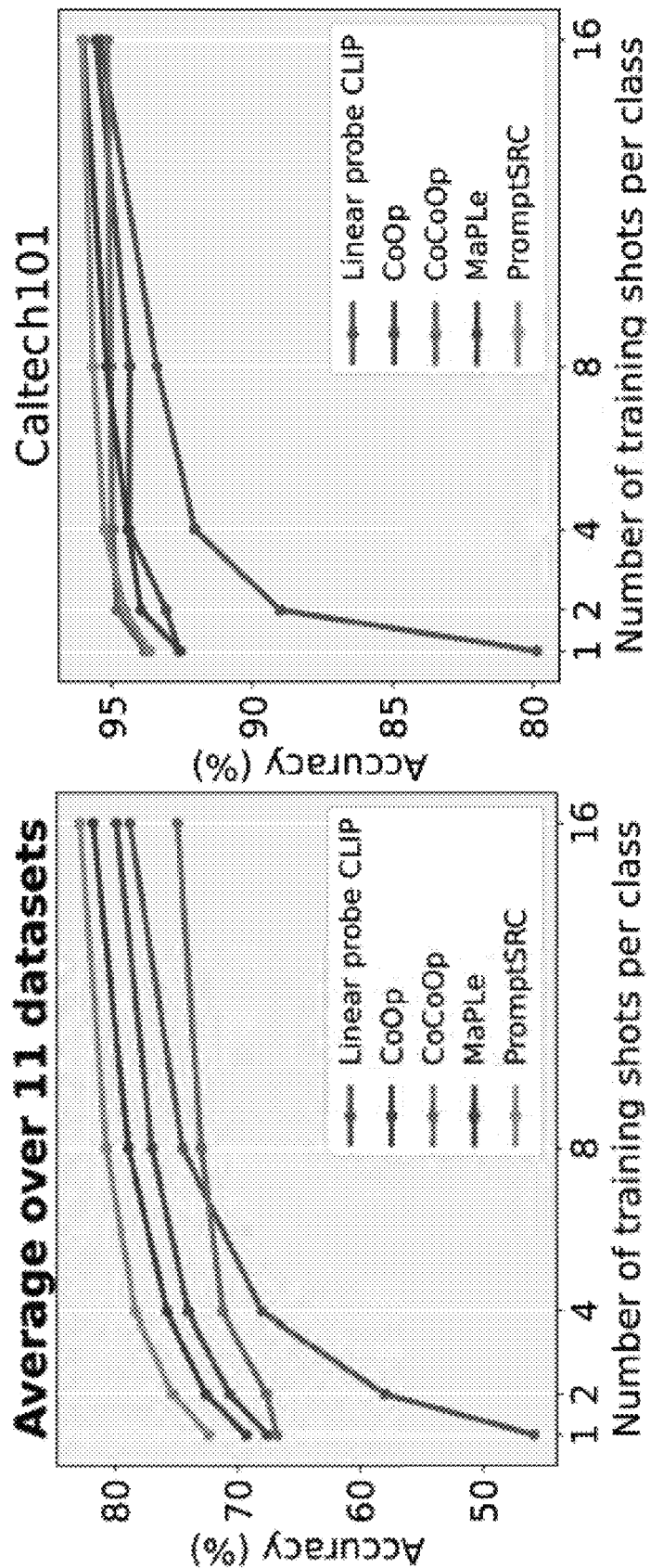
FIGS. 4A-4L are graphs comparing different prompt learning approaches in few-shot image recognition.
Figures 4C, 4D:
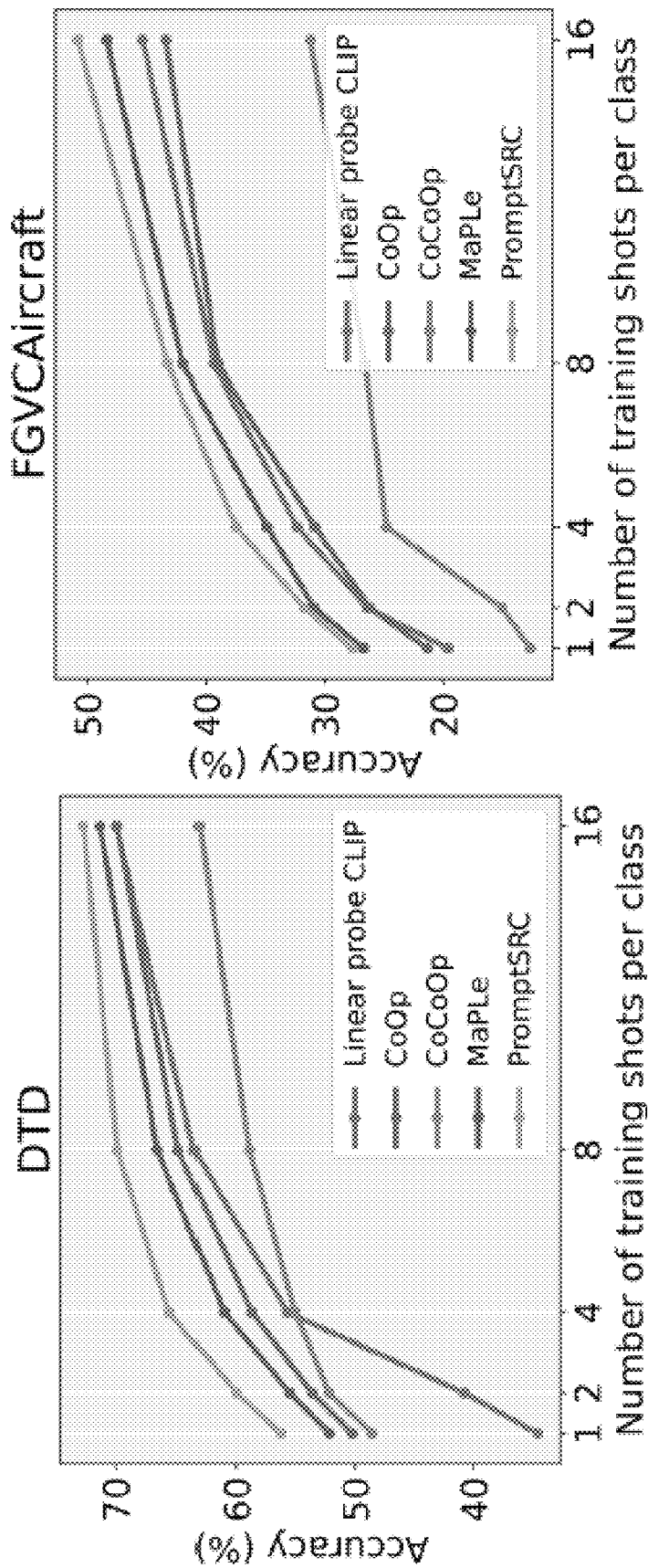
Figures 4E, 4F:
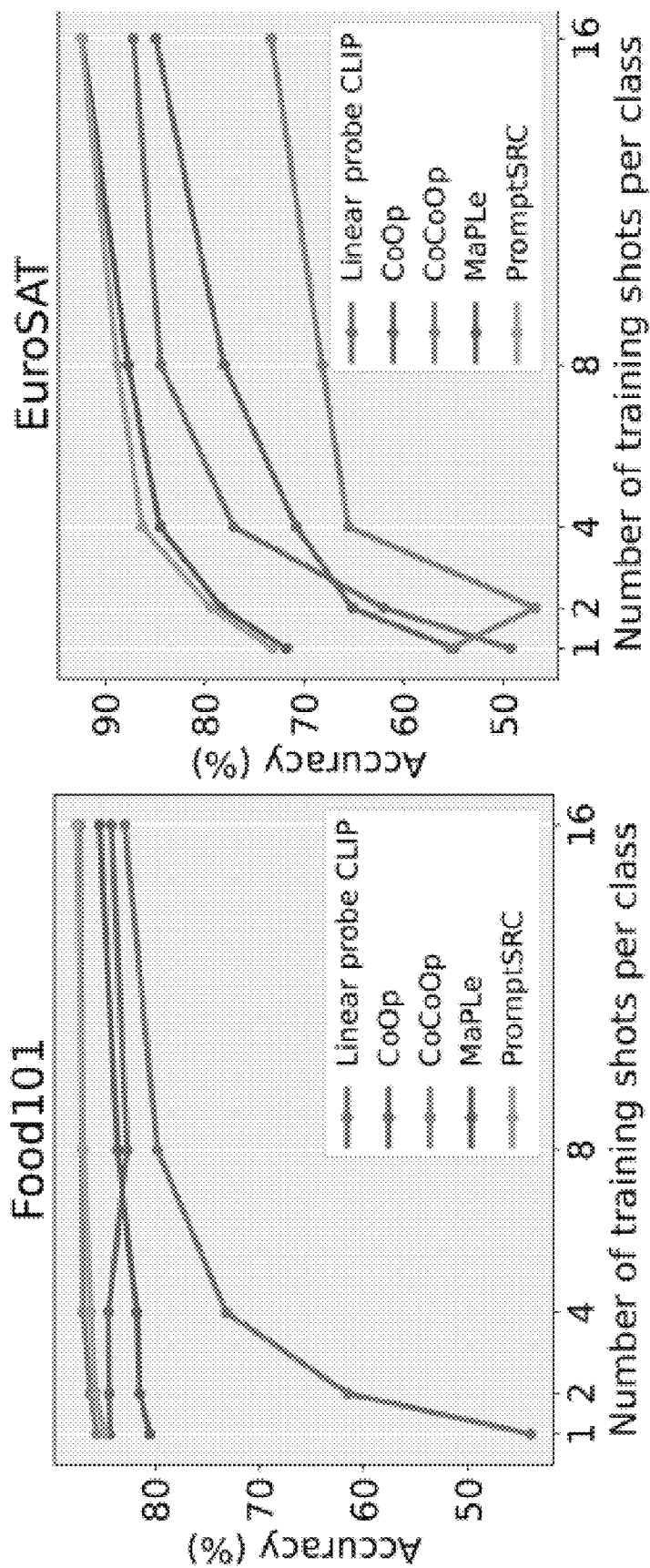
Figures 4G, 4H:
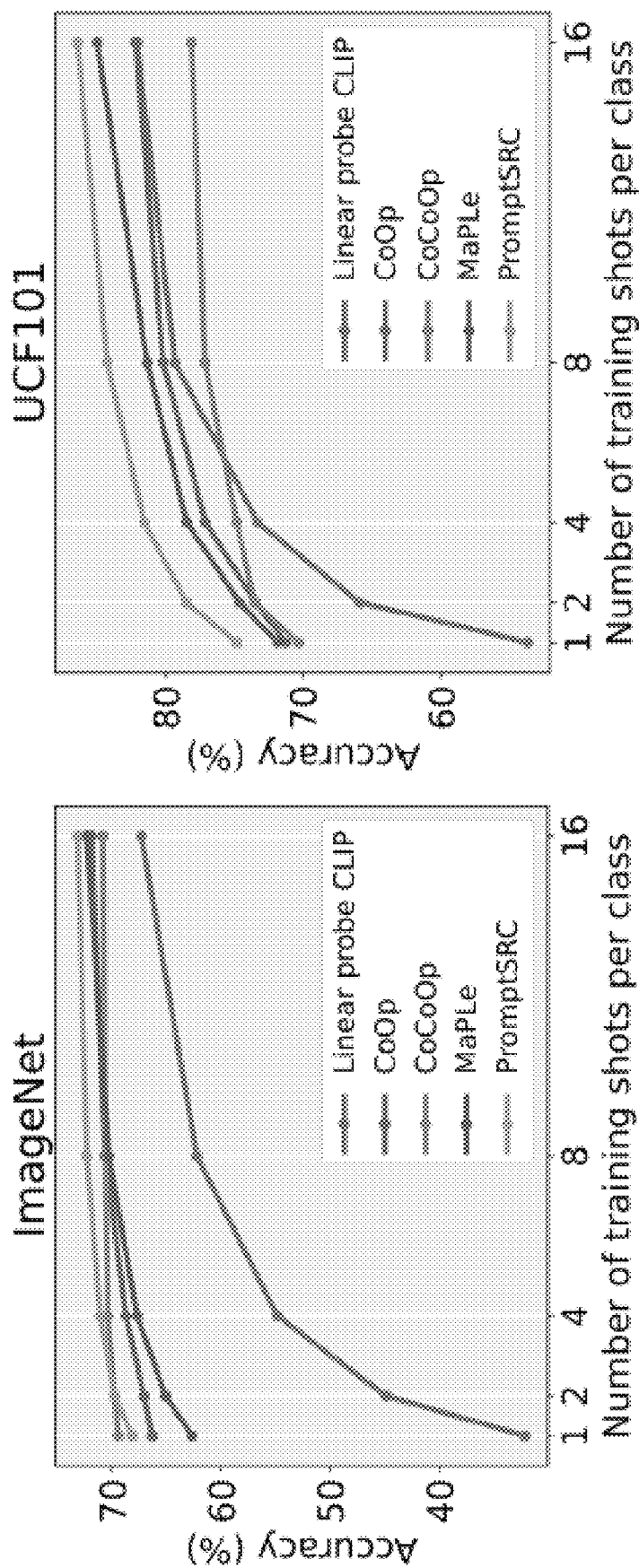
Figures 4I, 4J:
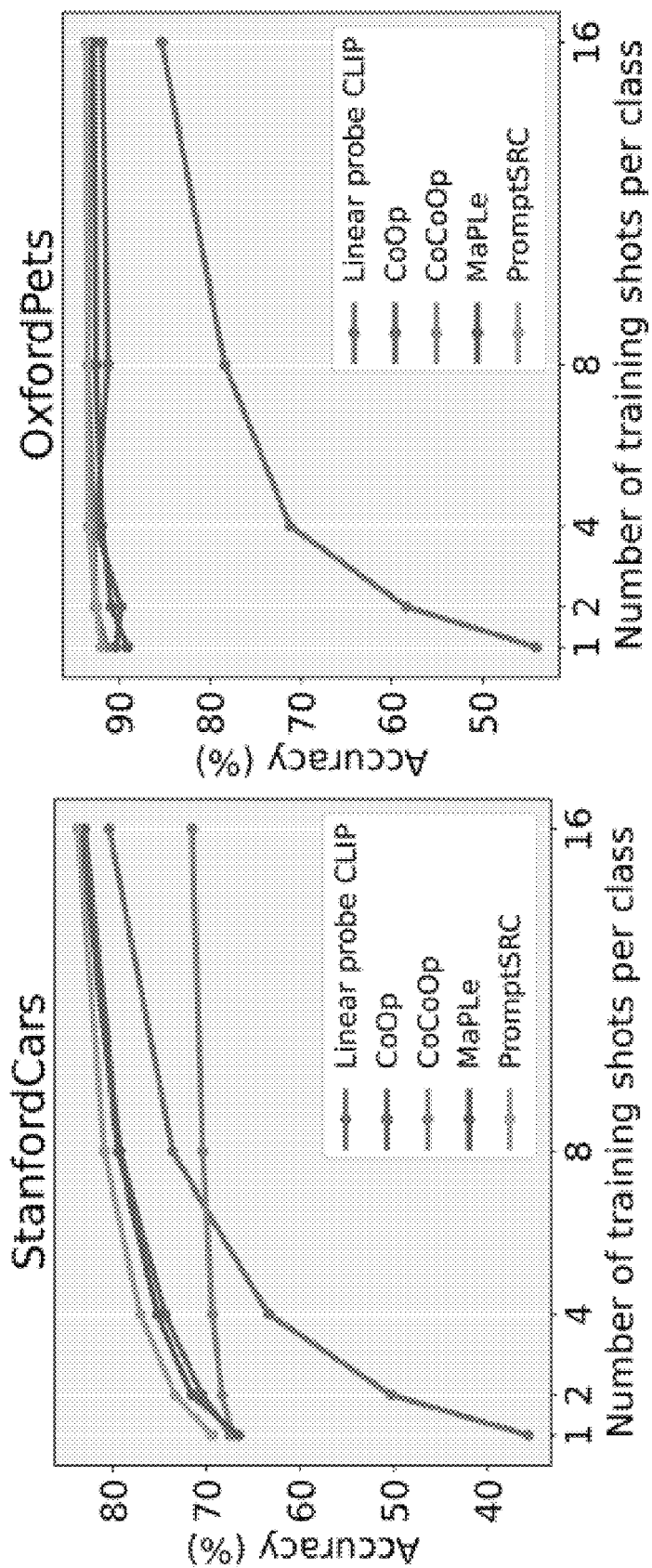
Figures 4K, 4L:
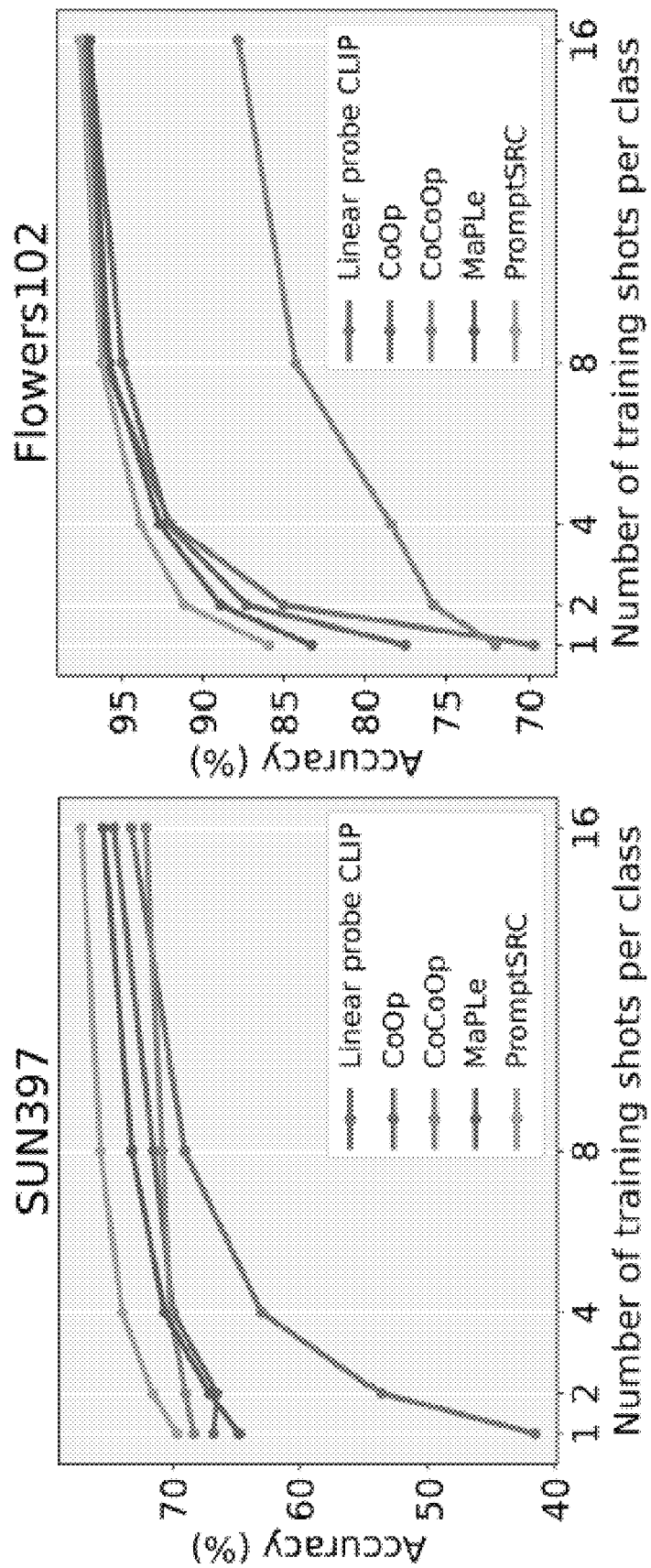

FIGS. 3A, 3B is a flow diagram for the PromptSRC framework. In addition, FIGS. 3A and 3B are referred to in providing a description of a baseline method, referred to as Independent Vision-Language Prompting (IVLP). The PromptSRC framework optimizes prompts as follows. a) Regularization through mutual agreement maximization imposes an explicit consistency constraint between prompted features and the pretrained CLIP features within the CLIP embedding space. b) Regularization through prompt self-ensembling further reduces overfitting by learning a Gaussian weighted average of the prompt vectors at different training epochs. This ensemble-level regularization aggregates information from learned prompts across different epochs for improved generalization. c) Regularization through textual diversity, which unlike having multiple images for each class, the text labels during fine-tuning are limited and bounded by the number of class categories. PromptSRC incorporates textual augmentations by defining multiple text label templates for a given class. The ensemble of textual labels regularizes the prompts for better generalization during optimization.

Before explaining self-regulating prompt learning, some definitions are provided regarding CLIP and CLIP-based prompt learning. In this disclosure, CLIP image and text encoders are denoted as f and g, respectively and their pretrained parameters as $\theta_{CLIP}=\{\theta_f, \theta_g\}$ where $\theta_f$ and $\theta_g$ refer to the image and text encoder parameters, respectively. The input image $X \in \mathbb{R}^{C \times H \times W}$ is divided into M patches followed by a projection to produce patch tokens. Further, a learnable class token $e_{cls}$ is appended with the input patches as $\tilde{X}=\{e_{cls}, e_1, e_2, \ldots, e_M\}$. The image encoder f encodes the input patches via multiple transformer blocks to produce a latent visual feature representation $\tilde{f}=f(\tilde{X},\theta_f)$, where $\tilde{f} \in \mathbb{R}^d$. Next, the corresponding class label y is wrapped within a text template such as 'a photo of a {class label}' which can be formulated as $Y=\{t_{SOS}, t_1, t_2 \ldots t_L, c_K, t_{EOS}\}$. Here $\{t_l|_{l=1}^{L}\}$ and $c_k$ are the word embeddings corresponding to the text template and the class label, respectively while $t_{SOS}$ and $t_{EOS}$ are the learnable start and end token embeddings. The text encoder g encodes Y via multiple transformer blocks to produce the latent textual feature as $\tilde{g}=g(Y, \theta_g)$, where $\tilde{g} \in \mathbb{R}^d$. For zero-shot inference, textual features of text template with class labels $\{1, 2, \ldots, C\}$ are matched with image feature $\tilde{f}$ as $$\frac{\exp(\sin(\tilde{g} \cdot \tilde{f})\tau)}{\sum_{i=1}^{C}\exp(\sin(\tilde{g}_i \cdot \tilde{f})\tau)},$$

where sim ( ) denotes the cosine similarity and $\tau$ is the temperature.

Baseline Prompt Learning: Prompt learning approaches append learnable prompt tokens at either the text encoder or image encoder. See Zhou et al., *IJCV* (2022); Zhou et al., *CVPR* (2022); and Bahng et al., each incorporated herein by reference in their entirety. In this disclosure, a simple baseline method is used that learns hierarchical prompt tokens on both the text and image encoders separately, referred to as Independent Vision-Language Prompting (IVLP).

Specifically, in FIG. 3A learnable T language: 306*l* and V visual 306*v* prompts, given as $P_t=\{p_t^1, p_t^2, \ldots, p_t^T\}$ and $P_v=\{p_v^1, p_v^2, \ldots, p_v^T\}$, are appended with (concatenated with 310) the textual 304 and visual 302 input tokens, respectively. Therefore, the image encoder 312 processes the following input tokens $\tilde{X}_p=\{P_v, e_{cls}, e_1, e_2, \ldots, e_M\}$ to generate prompted visual features represented as $\tilde{f}_p=f(\tilde{X}_p, \theta_f)$. Similarly, textual features are obtained using the textual encoder 314 as $\tilde{g}_p=g(Y_p, \theta_g)$, where $Y_p=\{t_{SOS}, P_t, t_1, t_2, \ldots, t_L, c_k, t_{EOS}\}$.

In contrast to shallow prompting where learnable prompts are introduced only at the first transformer block of the image and text encoders, the disclosed prompt learning approach uses deep prompting which learns separate sets of prompts at every transformer block. In this disclosure, the vision and language learnable prompts are jointly represented as P={$P_v$, $P_t$}. The feature representations obtained using these learnable prompts are referred to as prompted features.

For image classification on a downstream dataset $\mathcal{D}$, prompts P interact with pre-trained and frozen $\theta_f$ and $\theta_g$ and are optimized with the cross-entropy loss, $\mathcal{L}_{CE}$, as:

$$\mathcal{L}_{CE} = \underset{P}{\mathrm{argmin}}\ \mathbb{E}_{X,y \sim \mathcal{D}}\mathcal{L}(\mathrm{sim}(\tilde{f}_p, \tilde{g}_p), y). \tag{1}$$

The PromptSRC framework anchors prompt training with self-regularization which constitutes three main components. The PromptSRC. framework 300 for self-regulating prompt learning introduces textual diversity, Mutual Agreement Maximization constraints to regulate prompts, and prompt self-ensembling. Referring back to FIG. 3A, PromptSRC framework includes CLIP encoders 312, 314, which are used to generate prompted features ($\tilde{f}_p$, $\tilde{g}_p$) and pre-trained features ($\tilde{f}$, $\bar{g}$) at the image 302 and text 304 sides, respectively. In one embodiment, textual diversity is performed at the text side. In particular, textual augmentations 308 are performed to produce a diverse set of frozen textual features, which are averaged to obtain the pre-trained text features ($\bar{g}$) 318. Mutual Agreement Maximization 320 constraints ($\mathcal{L}_{SCL}$) 322, 324, 326 are employed to regulate the prompts, which ensure that the prompted features align well with the pre-trained VL representations at both the feature and logit levels. As CLIP is frozen, the same VL encoders 312, 314 are used to obtain both pre-trained and prompted features.

Further, in FIG. 3B, prompt self-ensembling combines the strengths of prompts (Visual and Language) learned at different epochs ($P_1, P_2, \ldots, P_E$) 332 during training using Gaussian weighted prompt aggregation (GPA 330). Final ensembled visual and textual prompts are also used for inferencing 334.

2. Details of Self-Regularization for Prompt Learning

A more detailed explanation of PromptSRC is provided next. Regarding the CLIP model, the $\mathcal{L}_{CE}$ objective employs ground truth labels to optimize the prompts for a downstream task. As a result, the prompts adapt and learn task-specific knowledge. During training, prompts interact with pre-trained and frozen CLIP tokens through self-attention layers in the transformer blocks. This interaction of prompt tokens with pre-trained CLIP weights $\theta_{CLIP}$ provides implicit regularization and encourages retaining the task-agnostic generalized knowledge within learned prompts. However, as shown in FIG. 2, prompts tend to overfit on the supervised task and drift away from the generalized CLIP space as the training schedule is prolonged. Consequently, new task performance is degraded, despite the fact that CLIP image and text encoder weights $\theta_f$ and $\theta_g$ are kept frozen. As prompts undergo further training, the implicit generalization ability of CLIP becomes weaker against the task-specific $\mathcal{L}_{CE}$ objective.

One naive approach to address the issue of reduction in generalization for supervised task training is to reduce the training schedule to balance the performance between fewer iterations to prevent losing generalization comes at the cost of relatively lower performance on the supervised task.

PromptSRC provides a prompt learning approach that maximizes supervised task performance without sacrificing performance on novel tasks and classes. As mentioned above, prompt training is anchored with self-regularization which constitutes three main components as discussed below.

2.1 Mutual Agreement Maximization

As discussed above, the strong downstream dataset transfer constraint imposed by cross-entropy loss $\mathcal{L}_{CE}$ causes the prompts to overfit on task-specific data and the constraint struggles to effectively utilize the general information from the frozen CLIP model. As a solution, PromptSRC explicitly guides the training trajectory by imposing a constraint to maximize its mutual agreement between the prompted features and the frozen CLIP features. This is achieved by explicitly conditioning the prompted features to be consistent with the CLIP features obtained without learnable prompts. Because this imposed constraint does not require any second model for such conditioning, the regularizing constraint is referred to as a self-consistency loss (SCL). For a given input sample and its corresponding textual label, visual features are obtained using learnable prompts and pre-trained visual features, $\tilde{f}_p$ and $\tilde{f}$ within the frozen CLIP latent space. Similarly, textual features $\tilde{g}_p$ and $\bar{g}$ are also obtained based on learnable prompts and pre-trained textual features.

Subsequently, a constraint is imposed on the prompted visual and text features to ensure their consistency with the CLIP pretrained features as follows 322, 326, $$\mathcal{L}_{SCL-image} = \sum_{i=1}^{d}|\tilde{f}_p - \tilde{f}|,\ \mathcal{L}_{SCL-text} = \sum_{i=1}^{d}|\tilde{g}_p - \bar{g}|. \tag{2}$$

L1 loss is utilized in Eq. 2 to impose the feature level consistency. Note that the self-consistency constraint is also compatible with other variants of matching losses such as cosine similarity or MSE loss, as discussed below with respect to ablations.

To further complement the regularization constraint and maximize the alignment between the general features and the prompted features, a logit level self-consistency regularization is imposed and the prompted logits distribution is conditioned on pre-trained CLIP logits distribution by minimizing the Kullback-Leibler divergence as follows 324, $$\mathcal{L}_{SCL-logits} = \mathcal{D}_{KL}(\mathrm{sim}(\tilde{f}_p, \tilde{g}_p), \mathrm{sim}(\tilde{f}, \bar{g})). \tag{3}$$

Overall, the self-consistency training objectives guide the prompts to gain complementary knowledge from pretrained CLIP features, therefore providing strongly generalized prompts, $$\mathcal{L}_{SCL} = \lambda_1 \mathcal{L}_{SCL-image} + \lambda_2 \mathcal{L}_{SCL-text} + \mathcal{L}_{SCL-logits}, \tag{4}$$

where $\lambda_1$ and $\lambda_2$ are loss balancing hyper-parameters. The total training objective thus becomes, $$\mathcal{L}_{final} = \mathcal{L}_{CE} + \mathcal{L}_{SCL}, \tag{5}$$

Regarding $\mathcal{L}_{final}$, $\mathcal{L}_{SCL}$ loss guides the prompts to converge at solutions that are generalized. On the other hand, $\mathcal{L}_{CE}$ guides the prompts to maximize performance on the downstream supervised tasks. The combination of these losses conditions the prompts to maximize their performance on supervised tasks and at the same time guides the prompts learning trajectory toward a weight space that is consistent with the CLIP zero-shot features. As shown in FIG. 2, PromptSRC maximizes the supervised tasks' performance while also improving the generalization. This shows that the training objectives for prompt learning in PromptSRC are complementary to each other.

2.2 Regularization with Prompt Self-Ensembling

A second component in the self-regularizing framework enforces regularization using prompt self-ensembling. Model ensembling in the weight space has been shown to improve both the performance and generalization of a model. However, ensembling has not been actively studied in the context of prompt learning, where prompts are the only learnable parameters while model parameters are frozen.

To effectively utilize the prompts knowledge from the previous training iterations, prompts are aggregated for a generalizable solution. For a training schedule with E total epochs, prompts at every epoch are given by $\{P\}_{t=1}^{E}$. Aggregated prompts (AP) are then calculated as, $$\{P\}^{AP} = \sum_{t=1}^{E} \frac{w_t \cdot P}{\sum_{i=1}^{E} w_i}, \quad (6)$$

where $w_i$ is the weight assigned to prompts at each epoch t.

In the early epochs, it has been determined that prompts are not mature enough to capture contextual information due to their random initialization. During aggregation, they should be given less weight as they act as noise which is carried along with the input tokens. On the other hand, the prompts learned in the last few epochs are task specific and highly favor the supervised downstream task distribution. Subsequently, a solution is to perform Gaussian weighted prompt aggregation (GPA), where small aggregation weights are given to prompts at initial epochs, higher weights to prompts at middle epochs, and relatively lower weights to prompts at final epochs, resulting in optimal prompt representations that improve generalization to downstream tasks: GPA provides optimal weight values $w_i$ by sampling from a Gaussian distribution $w_i \sim \mathcal{N}(\mu, \sigma^2)$, where $\sigma^2$ and $\mu$ are hyper-parameters and $\Sigma_{i=1}^{E} w_i = 1$. Gaussian distribution is defined over the epochs and its mean is dictated by the epoch number. This weighting is formulated as a moving average to avoid saving multiple copies of prompts by keeping one additional copy which is updated via aggregation at every epoch i, $$P^{GPA} = \sum_{i=1}^{E} w_i \cdot P_i. \quad (7)$$

2.3 Regulating Prompts with Textual Diversity

Through the $\mathcal{L}_{SCL}$ loss, the visual prompted features to instill diverse generalized contexts from pre-trained CLIP visual features as multiple image samples are present for each label category. This provides a natural source of augmentations at the image side and promotes additional regularization. However, as opposed to having multiple images per category, the text space during fine-tuning is limited, and prompted features are learned based on pre-trained CLIP text features, with only one feature representation per category. This mismatch between the available diversity at the image and text side leads to sub-optimal learning of prompted textual features. To address the diversity mismatch, textual diversity is incorporated in the text encoder. Specifically, a pool of textual prompt templates $\{PT|_{i=1}^{N}$, containing N augmentations are used to form multiple text features per category. The pre-trained CLIP textual features are now obtained as an ensemble of multiple prompts templates $$\bar{g} = \frac{1}{N} \sum_{i=1}^{N} g^i.$$

As pre-trained CLIP textual features are now represented by the ensemble of multiple augmentations for each label, the prompted textual features learn more diverse generalized contexts from the frozen CLIP. Note that the textual diversity is different from the standard prompt ensembling technique explored by CLIP authors. CLIP uses ensemble of text prompts during inference for classification. In contrast, PromptSRC uses them during training for self-regularization by enforcing mutual agreement of ensembled features with prompted features, and prompted features are used at inference. Next, the efficacy of components of PromptSRC is described via comprehensive experiments.

EXAMPLES

1. Evaluation Settings

PromptSRC is evaluated and compared with other methods on four benchmark settings. Base-to-novel class generalization: In this setting, the datasets are equally split into base and novel classes. The model is trained on base classes and evaluated on both base classes and novel classes. This benchmark evaluates the generalization ability of a method within a dataset.

Few-shot learning: The learning capacity of the PromptSRC model are evaluated under extremely limited supervision and verify if the approach learns complementary task-specific and task-agnostic knowledge. For each dataset, the model's generalization is tested for different K-shots per category, where K=1, 2, 4, 8, 16.

Domain generalization setting: Train a source model on ImageNet and evaluate it on out-of-distribution datasets to test performance under domain shifts. See Deng et al., incorporated herein by reference in its entirety.

Cross-dataset evaluation: In cross-dataset transfer, train the model on ImageNet and directly evaluate it on other datasets without any data-specific fine-tuning. See Deng et al.

Datasets: For base to novel class generalization, few-shot setting and cross-dataset evaluation, follow CoOp and CoCoOp, and use 11 image recognition datasets. The datasets. cover multiple recognition tasks including ImageNet and Caltech101 which consists of generic objects; OxfordPets, StanfordCars, Flowers102, Food101, and FGVCAircraft for fine-grained classification, SUN397 for scene recognition, UCF101 for action recognition, DTD for texture classification, and EuroSAT which consists of satellite images. See Deng et al.; Li Fei-Fei, Rob Fergus, and Pietro Perona. Learning generative visual models from few training examples: An incremental bayesian approach tested on 101 object categories. In *CVPR Workshop*, pages 178-178. IEEE, 2004; Omkar M Parkhi, Andrea Vedaldi, Andrew Zisserman, and CV Jawahar. Cats and dogs. In *CVPR*, pages 3498-3505. IEEE, 2012; Jonathan Krause, Michael Stark, Jia Deng, and Li Fei-Fei. 3d object representations for fine-grained categorization. In *ICCV*, pages 554-561, 2013; Maria-Elena Nilsback and Andrew Zisserman. Automated flower classification over a large number of classes. In *ICVGIP*, pages 722-729. IEEE, 2008; Lukas Bossard, Matthieu Guillaumin, and Luc Van Gool. Food-101-mining discriminative components with random forests. In *ECCV*, pages 446-461. Springer, 2014; Subhransu Maji, Esa Rahtu, Juho Kannala, Matthew Blaschko, and Andrea Vedaldi. Fine-grained visual classification of aircraft. *arXiv preprint arXiv:* 1306.5151, 2013; Jianxiong Xiao, James Hays, Krista A Ehinger, Aude Oliva, and Antonio Torralba. Sun database: Large-scale scene recognition from abbey to zoo. In *CVPR*, pages 3485-3492. IEEE, 2010; Khurram Soomro, Amir Roshan Zamir, and Mubarak Shah. Ucf101: A dataset of 101 human actions classes from videos in the wild. *arXiv preprint arXiv:* 1212.0402, 2012; Mircea Cimpoi, Subhransu Maji, Iasonas Kokkinos, Sammy Mohamed, and Andrea Vedaldi. Describing textures in the wild. In *CVPR*, pages 3606-3613, 2014; and Patrick Helber, Benjamin Bischke, Andreas Dengel, and Damian Borth, Eurosat: A novel dataset and deep learning benchmark for land use and land cover classification. *J-STARS*, 12(7):2217-2226, 2019, each incorporated herein by reference in their entirety. For domain generalization benchmark, we use ImageNet as a source dataset and use ImageNet-A, ImageNet-R, ImageNet-Sketch and ImageNetV2 as out of distribution datasets. See Dan Hendrycks, Kevin Zhao, Steven Basart, Jacob Steinhardt, and Dawn Song. Natural adversarial examples. In *CVPR*, pages 15262-15271, 2021; Dan Hendrycks, Steven Basart, Norman Mu, Saurav Kadavath, Frank Wang, Evan Dorundo, Rahul Desai, Tyler Zhu, Samyak Parajuli, Mike Guo, et al. The many faces of robustness: A critical analysis of out-of-distribution generalization. In *ICCV*, pages 8340-8349, 2021; Haohan Wang, Songwei Ge, Zachary Lipton, and Eric P Xing. Learning robust global representations by penalizing local predictive power. In *NeurIPS*, volume 32, 2019; and Benjamin Recht, Rebecca Roelofs, Ludwig Schmidt, and Vaishaal Shankar. Do imagenet classifiers generalize to imagenet? In *ICML*, pages 5389-5400. PMLR, 2019, each incorporated herein by reference in their entirety.

Implementation details: A ViT-B/16 based CLIP model was used in experiments and report results averaged over 3 runs. Deep prompting was used with V=T=4 VL prompts and train for 50 epochs for few-shot setting and 20 epochs the rest of the 3 benchmarks respectively. For domain generalization and cross-dataset evaluation, train the ImageNet source model on all classes with K=16 shots using V=T=4 VL prompts in the first 3 transformer layers. For few-shot and base-to-novel setting, prompts are learned in the first 9 transformer layers. Prompts are randomly initialized with a normal distribution except the text prompts of the first layer which are initialized with the word embeddings of "a photo of a". Fix the learning rate to 0.0025. Set $\lambda_1$=10 and $\lambda_2$=25 to weight $\mathcal{L}_{SCL-image}$ and $\mathcal{L}_{SCL-text}$ respectively. The corresponding hyperparameters are fixed across all datasets and benchmarks. For textual diversity, we use a total of N=60 standard prompt templates provided in Radford et al. For comparison with ProDA, results produced by Derakhshani et al. are disclosed herein. Additional implementation details are provided below.

2. Effectiveness of Self-Regulating Prompts

First, disentangle the regularization components in the self-regulating prompting framework and show the individual contributions in Table 2. Baseline IVLP provides high base class performance but suffers from poor generalization (row-1). By enforcing mutual agreement through $\mathcal{L}_{SCL}$ (row-2), novel class performance significantly increases by 3.95% while maintaining base class gains. This suggests that $\mathcal{L}_{SCL}$ explicitly enforces the prompts to capture the generalizable features from frozen CLIP. Integrating GPA (row-3) which suitably aggregates prompts across the training cycle further reduces overfitting and improves the novel class performance. Finally, combined with textual diversity to overcome the diversity mismatch between the text and visual domains (row-4), PromptSRC achieves improvements on both base and novel classes, leading to the average novel class and harmonic mean gains of +4.31% and +2.46% respectively. The averaged results on 11 datasets are summarized in Table 2. Note that even small improvements in these metrics correspond to significant gains. Results on individual datasets are provided below.

TABLE 1

Accuracy comparison on Base-to-novel generalization of PromptSRC with previous method. The prompts learned with our self-regularizing approach show overall consistent improvements on base classes, without losing generalization. Absolute gains over MaPLe are shown in blue.

| Dataset | | CLIP | CoOp | CoCoOp | ProDA | MaPLe | PromptSRC (Ours) | Δ |
|---|---|---|---|---|---|---|---|---|
| Average on | Base | 69.34 | 82.69 | 80.47 | 81.56 | 82.28 | 84.26 | +2.0 |
| 11 datasets | Novel | 74.22 | 63.22 | 71.69 | 72.30 | 75.14 | 76.10 | +1.0 |
| | HM | 71.70 | 71.66 | 75.83 | 76.65 | 78.55 | 79.97 | +1.4 |
| ImageNet | Base | 72.43 | 76.47 | 75.98 | 75.40 | 76.66 | 77.60 | +0.9 |
| | Novel | 68.14 | 67.88 | 70.43 | 70.23 | 70.54 | 70.73 | +0.2 |
| | HM | 70.22 | 71.92 | 73.10 | 72.72 | 73.47 | 74.01 | +0.5 |
| Caltech | Base | 96.84 | 98.00 | 97.96 | 98.27 | 97.74 | 98.10 | +0.4 |
| 101 | Novel | 94.00 | 89.81 | 93.81 | 93.23 | 94.36 | 94.03 | −0.3 |
| | HM | 95.40 | 93.73 | 95.84 | 95.68 | 96.02 | 96.02 | +0.0 |
| OxfordPets | Base | 91.17 | 93.67 | 95.20 | 95.43 | 95.43 | 95.33 | −0.1 |
| | Novel | 97.26 | 95.29 | 97.69 | 97.83 | 97.76 | 97.30 | −0.5 |
| | HM | 94.12 | 94.47 | 96.43 | 96.62 | 96.58 | 96.30 | −0.3 |
| Stanford | Base | 63.37 | 78.12 | 70.49 | 74.70 | 72.94 | 78.27 | +5.3 |
| Cars | Novel | 74.89 | 60.40 | 73.59 | 71.20 | 74.00 | 74.97 | +1.0 |
| | HM | 68.65 | 68.13 | 72.01 | 72.91 | 73.47 | 76.58 | +3.1 |
| Flowers102 | Base | 72.08 | 97.60 | 94.87 | 97.70 | 95.92 | 98.07 | +2.1 |
| | Novel | 77.80 | 59.67 | 71.75 | 68.68 | 72.46 | 76.50 | +4.1 |
| | HM | 74.83 | 74.06 | 81.71 | 80.66 | 82.56 | 85.95 | +3.4 |
| Food101 | Base | 90.10 | 88.33 | 90.70 | 90.30 | 90.71 | 90.67 | −0.1 |
| | Novel | 91.22 | 82.26 | 91.29 | 88.57 | 92.05 | 91.53 | −0.5 |
| | HM | 90.66 | 85.19 | 90.99 | 89.43 | 91.38 | 91.10 | −0.3 |

TABLE 1-continued

Accuracy comparison on Base-to-novel generalization of PromptSRC with previous method. The prompts learned with our self-regularizing approach show overall consistent improvements on base classes, without losing generalization. Absolute gains over MaPLe are shown in blue.

| Dataset | | CLIP | CoOp | CoCoOp | ProDA | MaPLe | PromptSRC (Ours) | Δ |
|---|---|---|---|---|---|---|---|---|
| FGVC | Base | 27.19 | 40.44 | 33.41 | 36.90 | 37.44 | 42.73 | +5.3 |
| Aircraft | Novel | 36.29 | 22.30 | 23.71 | 34.13 | 35.61 | 37.87 | +2.3 |
| | HM | 31.09 | 28.75 | 27.74 | 35.46 | 36.50 | 40.15 | +3.7 |
| SUN397 | Base | 69.36 | 80.60 | 79.74 | 78.67 | 80.82 | 82.67 | +1.9 |
| | Novel | 75.35 | 65.89 | 76.86 | 76.93 | 78.70 | 78.47 | −0.2 |
| | HM | 72.23 | 72.51 | 78.27 | 77.79 | 79.75 | 80.52 | +0.8 |
| DTD | Base | 53.24 | 79.44 | 77.01 | 80.67 | 80.36 | 83.37 | +3.0 |
| | Novel | 59.90 | 41.18 | 56.00 | 56.48 | 59.18 | 62.97 | +3.8 |
| | HM | 56.37 | 54.24 | 64.85 | 66.44 | 68.16 | 71.75 | +3.6 |
| EuroSAT | Base | 56.48 | 92.19 | 87.49 | 83.90 | 94.07 | 92.90 | −1.2 |
| | Novel | 64.05 | 54.74 | 60.04 | 66.00 | 73.23 | 73.90 | +0.7 |
| | HM | 60.03 | 68.69 | 71.21 | 73.88 | 82.35 | 82.32 | −0.1 |
| UCF101 | Base | 70.53 | 84.69 | 82.33 | 85.23 | 83.00 | 87.10 | +4.1 |
| | Novel | 77.50 | 56.05 | 73.45 | 71.97 | 78.66 | 78.80 | +0.1 |
| | HM | 73.85 | 67.46 | 77.64 | 78.04 | 80.77 | 82.74 | +2.0 |

See Radford et al.; Zhou et al., *IJCV* (2022); Zhou et al., *CVPR* (2022); Lu et al; and Khattak et al., each incorporated herein by reference in its entirety.

TABLE 2

Effect of our proposed regularization techniques. Results are averaged over 11 datasets.

| Method | Base Acc. | Novel Acc. | HM |
|---|---|---|---|
| 1: Independent V-L prompting | 84.21 | 71.79 | 77.51 |
| 2. $+\mathcal{L}_{SCL}$ | 84.21 | 75.38 | 79.55 |
| 3: +GPA | 84.16 | 75.69 | 79.70 |
| 4: +Textual diversity | 84.26 | 76.10 | 79.97 |

HM refers to harmonic mean.

3. Base-to-Novel Generalization

The performance of PromptSRC is compared with zero-shot CLIP, CoOp, CoCoOp, ProDA and MaPLe, in Table 1. Overall, all existing approaches outperform zero-shot CLIP on base classes but show inferior performance on novel classes except MaPLe. This suggests that they overall tend to lose the generalizable features stored in the frozen CLIP model. In contrast, PromptSRC significantly improves base class performance while improving the zero-shot CLIP novel class accuracy by 1.88%. This shows the importance of explicit guidance provided by PromptSRC in learning complementary task specific and task-agnostic representations which aid base and novel classes respectively.

CoOp is heavily trained on base classes and consequently compromises on its generalization. For instance, on EuroSAT, CoOp provides a substantial 92.19% base class. accuracy and inferior novel class accuracy of 54.74%. See Helber et al. On the other hand, PromptSRC which learns self-regulating prompts provides the highest base and novel class accuracies of 92.90% and 73.90% on EuroSAT respectively.

In comparison to CoCoOp and ProDA, PromptSRC shows gains on the 10/11 datasets respectively: Against the recent MaPLe approach, PromptSRC improves performance on 8/11 datasets while using 77× less tunable parameters (3.55M of MaPLe vs 46K of PromptSRC). With respect to the averaged results; PromptSRC provides the best results of 84.26%, 76.10%, and 79.97% on the base class, novel class, and harmonic mean respectively.

4. Few-Shot Examples

To explicitly verify if the regularization framework restricts the prompts to learn task-specific knowledge or not, few-shot results are compared with existing methods. FIGS. 4A-4L are graphs comparing different prompt learning approaches in few-shot image recognition. All methods are trained on VIT-B/16 CLIP backbone using their best settings. PromptSRC demonstrates consistent improvements over conventional methods specifically for lesser shots i.e., K=1, 2, 4. On average, PromptSRC provides the highest performance gains for all shots. These results demonstrate that PromptSRC learns complementary task-agnostic general features from frozen CLIP without being restricted from learning downstream tasks.

Further, all prompt learning approaches perform better than the linear probe, especially in scenarios with lesser shots i.e., K=1, 2, 4. When compared with the conventional best method MaPLe, PromptSRC consistently provides absolute gains of 3.05%, 2.72%, 2.59%, 1.80%, and, 1.07% on 1, 2, 4, 8, and 16 shots respectively which are averaged over 11 datasets. Furthermore, note that the approach achieves relatively larger gains in minimal data cases such as for K=1, 2 for almost all datasets. This demonstrates that PromptSRC regulates prompts against overfitting without restricting the prompts to learn task-specific knowledge.

Figure 8A:
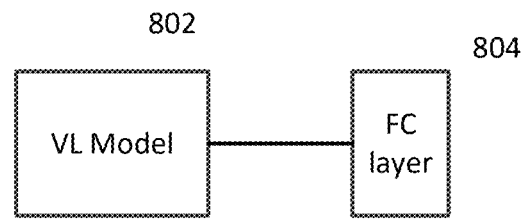
FIGS. 8A, 8B, 8C are block diagrams of implementations of VL model to downstream tasks.
Figure 8B:
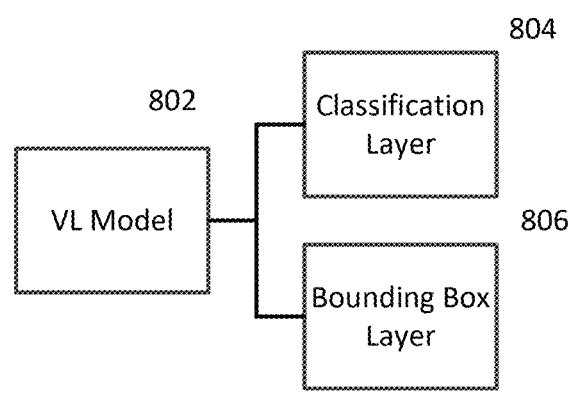
Figure 8C:
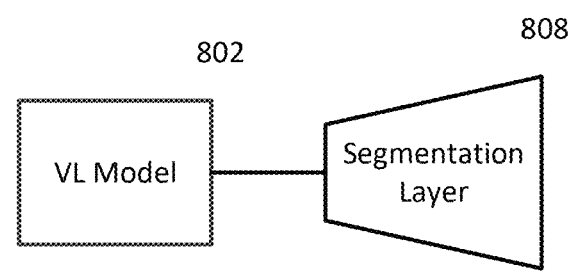

As mentioned above, the resulting VL model is suited for downstream tasks such as open-vocabulary image recognition, object detection, and image segmentation. FIGS. 8A, 8B, 8C are block diagrams of implementations of VL model to downstream tasks. In FIG. 8A, a machine learning architecture for the downstream task of open-vocabulary image recognition can include the PromptSRC model 802 trained for image classification together with a classification layer, such as a fully connected neural network layer 804 trained for image classification. In FIG. 8B, a machine learning architecture for the downstream task of object detection can include the PromptSRC model 802 trained for image classification together with a classification layer, such as a fully connected neural network layer 804 trained for image classification and a bounding box regression layer 806 trained for positioning a bounding box for the detected image. In FIG. 8C, a machine learning architecture for the downstream task of image segmentation can include the PromptSRC model 802 trained for image segmentation, including a decoder neural network 808 trained for image segmentation.

5. Cross Dataset Evaluation

Cross-dataset performance is compared with previous methods in Table 3. On the source dataset, PromptSRC performs comparably to other methods. In comparison with CoOp and CoCoOp, PromptSRC shows competitive performance and achieves better generalization in 8/10 and 7/10 datasets respectively. Compared with MaPLe, PromptSRC shows improved performance in 5/10 datasets while utilizing significantly less tunable parameters (46K vs 3.55M).

TABLE 3

Cross-dataset benchmark evaluation. PromptSRC achieves overall favourable performance.

| | Source | | | | | |
|---|---|---|---|---|---|---|
| | ImageNet | Caltech101 | OxfordPets | StanfordCars | Flowers102 | Food101 |
| CoOp | 71.51 | 93.70 | 89.14 | 64.51 | 68.71 | 85.30 |
| Co-CoOP | 71.02 | 94.43 | 90.14 | 65.32 | 71.88 | 86.06 |
| MaPLe | 70.72 | 93.53 | 90.49 | 65.57 | 72.23 | 86.20 |
| PromptSRC | 71.27 | 93.60 | 90.25 | 65.70 | 70.25 | 86.15 |

| | Target | | | | | |
|---|---|---|---|---|---|---|
| | Aircraft | SUN397 | DTD | EuroSAT | UCF101 | Average |
| CoOp | 18.47 | 64.15 | 41.92 | 46.39 | 66.55 | 63.88 |
| Co-CoOP | 22.94 | 67.36 | 45.73 | 45.37 | 68.21 | 65.74 |
| MaPLe | 24.74 | 67.01 | 46.49 | 48.06 | 68.69 | 66.30 |
| PromptSRC | 23.90 | 67:10 | 46.87 | 45.50 | 68.75 | 65.81 |

6. Domain Generalization Examples

Table 4 summarizes the results of PromptSRC and previous methods on out-of-distribution datasets. The model is directly evaluated when trained on ImageNet. On target datasets, PromptSRC consistently outperforms all existing methods, with an overall highest average accuracy of 60.65%. This suggests that the self-regulating framework favors better generalization for datasets with domain shifts.

TABLE 4

Domain generalization. Prompt learning methods are trained on imageNet and evaluated on datasets with domain shifts.

| | Source | Target | | | | |
|---|---|---|---|---|---|---|
| | ImageNet | -V2 | -S | -A | -R | Avg. |
| CLIP | 66.73 | 60.83 | 46.15 | 47.77 | 73.96 | 57.18 |
| CoOp | 71.51 | 64.20 | 47.99 | 49.71 | 75.21 | 59.28 |
| Co-CoOp | 71.02 | 64.07 | 48.75 | 50.63 | 76.18 | 59.91 |
| MaPLe | 70.72 | 64.07 | 49.15 | 50.90 | 76.98 | 60.27 |
| PromptSRC | 71.27 | 64.35 | 49.55 | 50.90 | 77.80 | 60.65 |

4.7. Ablative Analysis

Embedding consistency loss ablation: In Table 5, ablate on the choice of matching loss metric used in our proposed feature level $\mathcal{L}_{SCL}$ loss constraints. For simplicity, only incorporate $\mathcal{L}_{SCL\text{-}image}$ and $\mathcal{L}_{SCL\text{-}text}$ on top of the IVLP baseline. Generally, distance-based matching metrics outperform the cosine similarity metric in terms of generalization as they impose a much harder constraint. Overall, the L1 matching metric provides the highest HM.

TABLE 5

Effect of matching losses for $\mathcal{L}_{SCL\text{-}image}$ and $\mathcal{L}_{SCL\text{-}image}$ consistency objectives. L1 matching loss provides highest HM.

| Method | Base Acc. | Novel Acc. | HM |
|---|---|---|---|
| 1: Independent V-L prompting (IVLP) | 84.21 | 71.79 | 77.51 |
| 2: IVLP + Cosine similarity | 84.47 | 74.51 | 79.17 |
| 3: IVLP + Mean square error (MSE) | 84.59 | 74.68 | 79.33 |
| 4: IVLP + L1 | 84.42 | 74.99 | 79.43 |

Prompt ensembling: Table 6 shows ablation on various prompt ensembling techniques. Using equal weights for prompts reduces base class results as initial epoch. prompts are not mature enough. In contrast, the Gaussian weighted prompt aggregation results in the highest performance. Detailed ablation experiments for other hyperparameters are provided below.

TABLE 6

Ablation on prompt ensembling techniques. Gaussian weighted prompt aggregation (GPA) provides better performance.

| Method | Base Acc. | Novel Acc. | HM |
|---|---|---|---|
| 1: Exponential moving average | 83.09 | 76.15 | 79.47 |
| 2: Equal weighting (averaging) | 83.50 | 76.47 | 79.83 |
| 3: GPA (Ours) | 84.26 | 76.10 | 79.97 |

The following is supplemental information and encompasses more implementation details, results comparison, and a thorough ablative analysis of PromptSRC. The contents are organized in the following order.

Additional implementation details.
Additional results comparison.
Additional ablative analysis

A. Additional Implementation details

Additional Training details: A publicly available VIT-B/16 CLIP model is used with d=512 and a learning rate of 0.0025 which is fixed for all experiments in all benchmarks. PromptSRC is trained for 50 epochs for few-shot settings and 20 epochs for the remaining three benchmark settings respectively. The respective epochs are fixed across all datasets. All models are trained using SGD optimizer and utilize a single NVIDIA A100 GPU.

FIG. 7 is a block diagram illustrating an example computer system for implementing the machine learning training and inference methods according to an exemplary aspect of the disclosure. The computer system may be an AI workstation or server 702 running an operating system, for example Ubuntu Linux OS, Windows OS, a version of Unix OS, or Mac OS. The computer system 702 may include one or more central processing units (CPU) 750 having multiple cores. The computer system 700 may include a graphics board 712 having multiple GPUs, each GPU having GPU memory. The graphics board 712 may perform many of the operations of the disclosed machine learning methods in parallel. The computer system 700 includes main memory 702, typically random access memory RAM, which contains the software being executed by the processing cores 750 and GPUs 712, as well as a non-volatile storage device 704 for storing data and the software programs for performing the machine learning algorithms of the present invention. Several interfaces for interacting with the computer system 700 may be provided, including an I/O Bus Interface 710, Input/Peripherals 718 such as a keyboard, touch pad, mouse, Display Adapter 716 and one or more Displays 708, and a Network Controller 706 to enable wired or wireless communication through a network 99. The interfaces, memory and processors may communicate over the system bus 726. The computer system 700 includes a power supply 721, which may be a redundant power supply.

In some embodiments, the computer system 702 may include a multi-core CPU and a graphics card by NVIDIA, in which the GPUs have multiple CUDA cores. As mentioned above, a VIT-B/16 CLIP model, as a pretrained VT model and PromptSRC have been implemented using a single NVIDIA A100 GPU.

Gaussian Weighted Prompt Aggregation (GPA): Note that the prompts learned in the initial training epochs are not mature and act as noise due to their random initialization. On the other hand, prompts learned in the last few epochs are task-specific and highly favors the supervised downstream task distribution. GPA strives to maintain a balance by assigning lower weights to initial prompts, higher weights to middle prompts, and relatively lower weights to final prompts, resulting in optimal prompt representations that improve generalization to downstream tasks. Gaussian distribution in GPA is defined over the epochs and its mean is dictated by the epoch number. Then weights are sampled $(w_i \sim \mathcal{N}(\mu, \sigma^2))$ for prompts of every epoch to get the final prompt aggregation. Hyper-parameters are set using validation splits Table 7 shows the hyper-parameter values chosen for the proposed GPA technique, which are kept fixed for respective base-to-novel generalization, cross-dataset and domain generalization setting. For few-shot setting, $\mu=30$ and $\sigma^2=30$ are used for ImageNet, Caltech101, Oxford-Pets, Food101, UCF101 and SUN397. For datasets including StanfordCars, Flowers 102, FGVCAircraft, DTD and EuroSAT, $\mu=45$ and $\sigma^2=5$ are used.

TABLE 7

Hyper-parameters settings used in GPA technique for various benchmark settings.

| GPA parameter | Base-to-Novel | Cross dataset | D.G |
|---|---|---|---|
| $\mu$ | 15 | 6 | 6 |
| $\sigma^2$ | 1 | 10 | 10 |

D.G refers to domain generalization.

Textual diversity: For the textual diversity technique, 60 prompt templates are randomly selected from the complete template list provided in Radford et al., incorporated herein by reference. Specifically, the textual diversity component uses the following prompt templates.

"a photo of a {category}."
"a bad photo of a {category}."
"a photo of many {category}."
"a sculpture of a {category}."
"a photo of the hard to see {category}."
"a low resolution photo of the {category}."
"a rendering of a {category}."
"graffiti of a {category}."
"a bad photo of the {category}."
"a cropped photo of the {category}."
"a tattoo of a {category}."
"the embroidered {category}."
"a photo of a hard to see {category}."
"a bright photo of a {category}."
"a photo of a clean {category}"
"a photo of a dirty {category}."
"a dark photo of the {category}."
"a drawing of a {category}."
"a photo of my {category}."
"the plastic {category}."
"a photo of the cool {category}."
"a close-up photo of a {category}."
"a black and white photo of the {category}."
"a painting of the {category}."
"a painting of a {category}."
"a pixelated photo of the {category}."
"a sculpture of the {category}."
"a bright photo of the {category}."
"a cropped photo of a {category}."
"a plastic. {category}."
"a photo of the dirty {category}."
"a jpeg corrupted photo of a {category}."
"a blurry photo of the {category}."
"a photo of the {category}."
"a good photo of the {category}."
"a rendering of the {category}."
"a {category} in a video game."
"a photo of one {category}."
"a doodle of a {category}."
"a close-up photo of the {category}."
"the origami {category}."
"the {category} in a video game."
"a sketch of a {category}."
"a doodle of the {category}."
"a origami {category}."
"a low resolution photo of a {category}."
"the toy {category}."
"a rendition of the {category}."
"a photo of the clean {category}."
"a photo of a large {category}."
"a rendition of a {category}."
"a photo of a nice {category}."
"a photo of a weird {category}."
"a blurry photo of a {category}."
"a cartoon {category}."
"art of a {category}."
"a sketch of the {category}."
"a embroidered {category}."
"a pixelated photo of a {category}."
"itap of the {category}."

Evaluation metrics: Top-1 base-class and novel class accuracy are reported for each dataset in base-to-novel generalization setting. Also, harmonic mean (HM) between base and novel class accuracy is reported which is the main metric that represents generalization performance.

For all shots (K=1, 2, 4, 8, 16) in few-shot setting, Top-1 accuracies obtained on the corresponding test-set of each dataset are reported using the splits provided in CoOp.

Similar to few-shot setting, Top-1 accuracies obtained on the test set of each dataset are reported for cross dataset evaluation and domain generalization experiments respectively.

Figure 9:
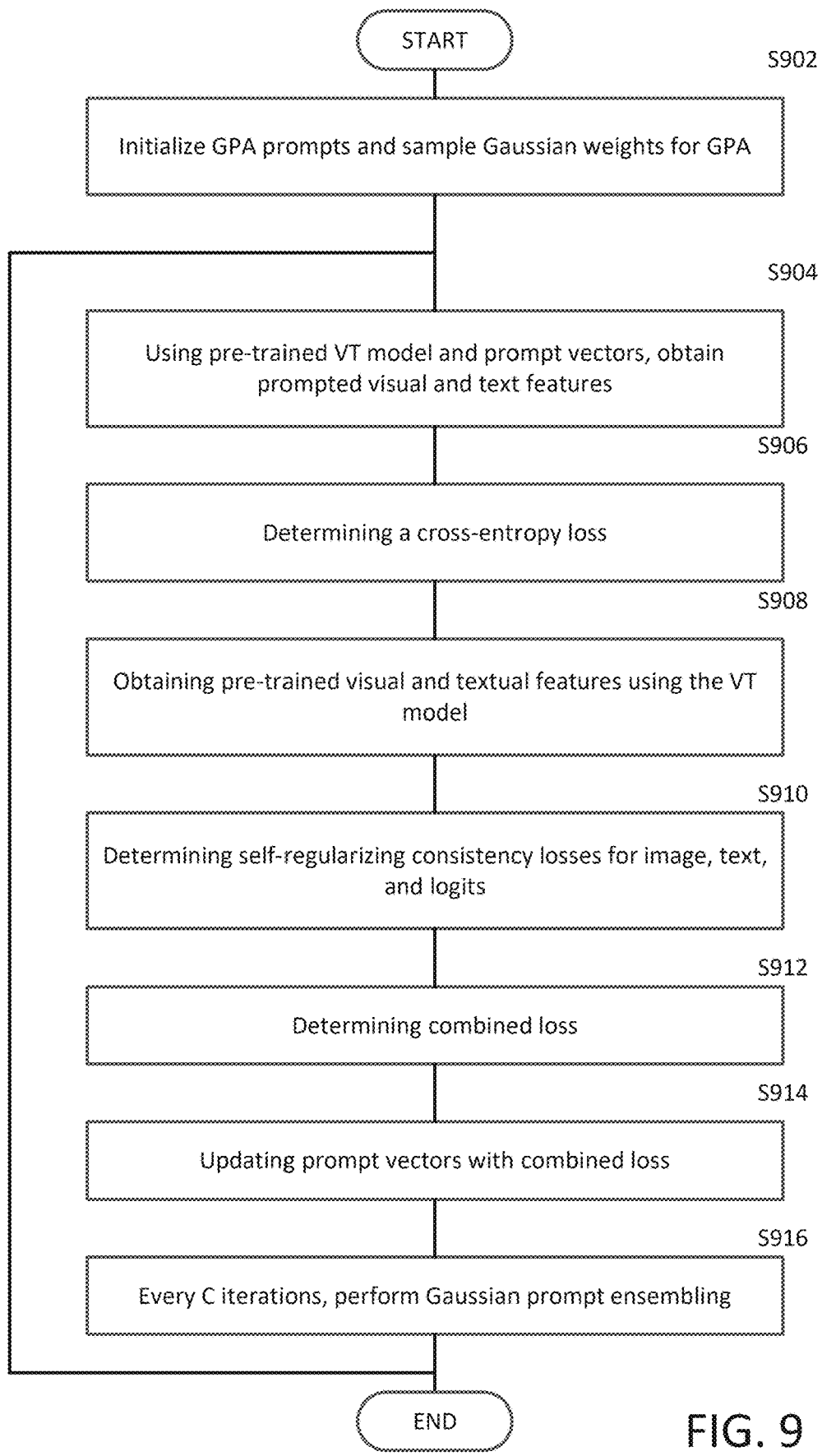
FIG. 9 is a flowchart for the PromptSRC framework, in accordance with exemplary aspects of the disclosure.

Algorithm: In algorithm 1, the pseudo-code implementation of proposed PromptSRC framework is provided. FIG. 9 is a flowchart for Algorithm 1 highlighting initialization step S902 and iterative steps S904 to S916, for T epochs. Algorithm 1, below, provides a formal description of the algorithm:

As noted above, the algorithm can be implemented on a graphical processing unit (GPU), as well as on a microprocessor that is configured for machine learning, referred to as a machine learning engine, such as the machine learning engine in the M2 or M3 system on chip (SoC) of Apple, or the NVIDIA Titan GPU. The algorithm can also be implemented in a cloud service that offers AI development. These alternative implementations are referred to as ML engine.

In particular, in S902, the ML engine initializes GPA prompts and sample Gaussian weights for GPA.

The ML engine performs training over T epochs for steps S904 to S916.

In S904, the ML engine uses pre-trained VT model and prompt vectors, and obtains prompted visual and text features.

In S906, the ML engine determines a cross-entropy loss.

In S908, the ML engine obtains pre-trained visual and textual features using the VT model.

In S910, the ML engine determines self-regularizing consistency losses for image, text, and logits.

In S912, the ML engine determines a combined loss.

In S914, the ML engine updates prompt vectors with the combined loss.

In S916, the ML engine performs, preferably every C iterations, prompt ensembling.

---

Algorithm 1 Learning Self-regulating prompts

Input: Dataset $\mathcal{D} = \{X, y\}^N$, Model $\theta_{CLIP} = \{\theta_v, \theta_t\}$,
Prompt vectors $P = \{P_v, P_t\}$. No. of text templates = N.
iteration (i) = 1.
Require: Initialize GPA prompt param. $P^{GPA} = \{p_v, p_t\}^{GPA}$. Sample Gaussian weights for GPA$\{w_1, w_2, w_3, w_T\}$. GPA is applied after every c iterations.
for $i \in [1, T]$ do
  Sample data $\{X, y\} \subseteq \mathcal{D}$.
  // prompted features.
  Using $\theta_{CLIP}$ and P, obtain prompted visual and text features
  $\tilde{f}_p \leftarrow f(\tilde{x}_p, \theta_f), \tilde{g}_p \leftarrow g(\tilde{y}_p, \theta_g)$
  //normal CE supervision loss.
  $\mathcal{L}_{sup} \leftarrow \mathcal{L}_{CE}(\text{sim}(\tilde{f}_p, \tilde{g}_p), y)$
  //pre-trained features.
  Obtain pre-trained visual and textual features using only $\theta_{CLIP}$ $\tilde{f} \leftarrow f(\tilde{x}, \theta_f), \tilde{g} \leftarrow \frac{1}{N}\sum_{i=1}^{N} g(\tilde{y}^i, \theta_g)$ //self-regularizing consistency losses
  $\mathcal{L}_{SCL} \leftarrow \lambda_1 \mathcal{L}_{SCL-image}(\tilde{f}_p, \tilde{f}) + \lambda_2 \mathcal{L}_{SCL-text}(\tilde{g}_p, \tilde{g}) +$
  $\mathcal{L}_{SCL-logits}(\text{sim}(\tilde{f}_p, \tilde{g}_p), \text{sim}(\tilde{f}, \tilde{g}))$
  //compute total loss.
  $\mathcal{L}_{final} \leftarrow \mathcal{L}_{sup} + \mathcal{L}_{SCL}$
  //update prompt vectors with combined loss.
  $P \leftarrow P - \delta \nabla_P \mathcal{L}_{final}$
  //Gaussian prompt ensembling.
  if mod(i, c) == then
    $P^{GPA} \leftarrow P^{GPA} + w_i \cdot P$
  end if
end for

---

B. Additional Results Comparison

In this section, additional per-dataset results comparison are provided and show the compatibility of PromptSRC for diverse tasks and conventional VL models.

Generalization of PromptSRC towards video understanding tasks: The applicability of the approach is verified across new tasks and PromptSRC is evaluated on a video action recognition generalization benchmark. Following the base-to-novel generalization setting of ViFi-CLIP; PromptSRC is employed on a Kinetics-400 pre-trained ViFi-CLIP and to learn prompts on UCF-101 video dataset. The UCF-101 video dataset contains image samples for 101 action classes that are organized under five types: Human-Object Interaction, Body-Motion Only, Human-Human Interaction, Playing Musical Instruments, and Sports.

The results are shown in Table 8. In comparison with the naive IVLP method, PromptSRC shows favorable performance gains and even surpasses fully fine-tuned video-adapted CLIP models like ActionCLIP. This suggests that the proposed PromptSRC approach can generalize to other diverse modality downstream tasks including videos.

TABLE 8

Performance comparison in video action recognition generalization benchmark on UCF-101. We employ PromptSRC and IVLP on ViFi-CLIP and compare with the prior video approaches.

| Method | Base Acc. | Novel Acc. | HM |
|---|---|---|---|
| Vanilla CLIP | 78.50 | 63.60 | 70.30 |
| ActionCLIP | 85.60 | 75.30 | 80.10 |
| XCLIP | 95.40 | 74.00 | 83.40 |
| A5 | 95.80 | 71.00 | 81.60 |
| IVLP | 95.90 | 74.10 | 83.60 |
| PromptSRC | 96.43 | 76.79 | 85.50 |

Training and inference compute cost analysis: In Table 9, the compute cost analysis of the approach are shown and compare it with other prompting methods. PromptSRC's overall training GFLOPs are only 0.13× higher than baseline IVLP, while it maintains the same GFLOPs and throughput during inference. Pre-trained CLIP textual features are pre-computed and a single additional forward pass is required through the image encoder to: compute pretrained CLIP visual features for our mutual agreement maximization technique. The training time of PromptSRC is 9.3% longer than IVLP which is significantly lower than CoCoOp. 4 vision and text prompts similar to the IVLP baseline are used.

TABLE 9

PromptSRC compute cost comparison using SUN397 dataset. Training time for all methods is calculated for 10 epochs on a single A100 GPU on SUN397 dataset.

| Method | GFLOP (train) | GFLOP (test) | Train time (min) | FPS | HM |
|---|---|---|---|---|---|
| CoOp | 162.5 | 162.5 | 10.08 | 1344 | 71.66 |
| CoCoOp | 162.5 | 162.5 | 39.53 | 15.08 | 75.83 |

TABLE 9-continued

PromptSRC compute cost comparison using SUN397 dataset.
Training time for all methods is calculated for 10
epochs on a single A100 GPU on SUN397 dataset.

| Method | GFLOP (train) | GFLOP (test) | Train time (min) | FPS | HM |
| --- | --- | --- | --- | --- | --- |
| IVLP | 162.8 | 162.8 | 12.01 | 1380 | 77.51 |
| PromptSRC | 179.6 | 162.8 | 13.13 | 1380 | 79.97 |

Compatibility of PromptSRC in conventional foundational. VI. models: The effectiveness of the approach is demonstrated above on the CLIP Vision-Language (VL) model. To assess how the approach scales with more recent foundational VL models, an analysis is conducted using a newly introduced VL model, EVA-CLIP (CVPR'23). See Yuxin Fang, Wen Wang, Binhui Xie, Quan Sun, Ledell Wu, Xinggang Wang, Tiejun Huang, Xinlong Wang, and Yue Cao. Eva: Exploring the limits of masked visual representation learning at scale. In *CVPR*, pages 19358-19369, 2023, incorporated herein by reference in its entirety. EVA-CLIP has been pre-trained using advanced self-supervision and optimization techniques. The IVLP and PromptSRC prompting approaches are employed to fine-tune the EVA-CLIP VIT-B/16 model in the base-to-novel generalization setting. The comparison of results is presented in Table 11. PromptSRC consistently improves the generalization performance on 10/11 datasets and provides an absolute average HM gain of +2.09% in comparison with the IVLP baseline approach.

TABLE 10

Analysis on alternate design choices for the textual diversity
in PromptSRC. Incorporating textual diversity by ensembling
multiple text templates achieves better generalization.

| Method | Base Acc. | Novel Acc. | HM |
| --- | --- | --- | --- |
| Independent V-L prompting (IVLP) | 84.21 | 71.79 | 77.51 |
| PromptSRC with single prompt diversity | 84.32 | 75.52 | 79.68 |
| PromptSRC with ensembled prompt diversity | 84.26 | 76.10 | 79.97 |

TABLE 11

Compatibility of PromptSRC approach using a recent V-L model:
EVA CLIP [9] in the Base-to-novel generalization setting.
PromptSRC shows overall favourable performance on EVA CLIP.
Absolute gains over IVLP method are shown in blue.

| Dataset | | IVLP | PromptSRC | Δ |
| --- | --- | --- | --- | --- |
| Average on | Base Acc. | 86.31 | 86.34 | +0.03 |
| 11 datase | Novel Acc. | 74.96 | 78.68 | +3.72 |
| | HM | 80.24 | 82.33 | +2.09 |
| ImageNet | Base Acc. | 82.13 | 82.40 | +0.27 |
| | Novel Acc. | 72.20 | 76.03 | +3.83 |
| | HM | 76.85 | 79.09 | +2.24 |
| Caltech101 | Base Acc. | 99.33 | 98.97 | −0.36 |
| | Novel Acc. | 96.47 | 97.10 | +0.63 |
| | HM | 97.88 | 98.03 | +0.15 |
| OxfordPets | Base Acc. | 95.17 | 95.63 | +0.46 |
| | Novel Acc. | 98.43 | 98.43 | +0.00 |
| | HM | 96.77 | 97.01 | +0.24 |
| Stanford | Base Acc. | 85.90 | 85.07 | −0.83 |
| Cars | Novel Acc. | 83.97 | 86.40 | +2.43 |
| | HM | 84.92 | 85.73 | +0.81 |
| Flowers102 | Base Acc. | 99.47 | 99.47 | +0.00 |
| | Novel Acc. | 77.43 | 79.57 | +2.14 |
| | HM | 87.08 | 88.41 | +1.34 |
| Food101 | Base Acc. | 90.60 | 91.37 | +0.77 |
| | Novel Acc. | 90.70 | 91.97 | +1.27 |
| | HM | 90.65 | 91.67 | +1.02 |
| FGVC | Base Acc. | 46.80 | 46.40 | −0.40 |
| Aircraft | Novel Acc. | 28.90 | 28.80 | −0.10 |
| | HM | 35.73 | 35.54 | −0.19 |
| SUN397 | Base Acc. | 83.30 | 84.50 | +1.20 |
| | Novel Acc. | 76.93 | 80.80 | +3.87 |
| | HM | 79.99 | 82.61 | +2.62 |
| DTD | Base Acc. | 84.60 | 86.27 | +1.67 |
| | Novel Acc. | 59.47 | 63.53 | 4.06 |
| | HM | 69.84 | 73.17 | +3.33 |
| EuroSAT | Base Acc. | 96.13 | 93.43 | −2.70 |
| | Novel Acc. | 62.90 | 82.30 | +19.40 |
| | HM | 76.04 | 87.51 | +11.47 |
| UCF101 | Base Acc. | 86.00 | 86.23 | +0.23 |
| | Novel Acc. | 77.20 | 80.57 | +3.37 |
| | HM | 81.36 | 83.30 | +1.94 |

Results of individual components: In Table 12, the per-dataset results are shown for each component of the PromptSRC framework in the base-to-novel generalization setting. The results indicate that overall, the regularization components are effective in improving performance in comparison with the naive IVLP prompt learning approach.

TABLE 12

Detailed performance comparison on individual datasets for showing effect of
individual components in PromptSRC approach. Absolute gains of PromptSCR
(IVLP + $\mathcal{L}_{SCL}$ + GPA + Textual diversity) over the IVLP are shown in blue.

| Dataset | | IVLP | +$\mathcal{L}_{SCL}$ | +GPA | +Textual diversity | Δ |
| --- | --- | --- | --- | --- | --- | --- |
| Average on | Base Acc. | 84.21 | 84.21 | 84.16 | 84.26 | +0.04 |
| 11 datasets | Novel Acc. | 71.79 | 75.38 | 75.69 | 76.10 | +4.31 |
| | H.M | 77.51 | 79.55 | 79.70 | 79.97 | +2.46 |
| ImageNet | Base Acc. | 77.00 | 77.53 | 77.47 | 77.60 | +0.60 |
| | Novel Acc. | 66.50 | 69.77 | 70.03 | 70.73 | +4.23 |
| | H.M | 71.37 | 73.45 | 73.56 | 74.01 | +2.64 |
| Caltech101 | Base Acc. | 98.30 | 98.03 | 97.97 | 98.10 | −0.20 |
| | Novel Acc. | 93.20 | 94.37 | 94.67 | 94.03 | +0.83 |
| | H.M | 95.68 | 96.17 | 96.29 | 96.02 | +0.34 |
| OxfordPets | Base Acc. | 94.90 | 95.37 | 95.27 | 95.43 | +0.43 |
| | Novel Acc. | 97.20 | 97.03 | 97.10 | 97.30 | +0.10 |
| | H.M | 96.04 | 96.19 | 96.18 | 96.30 | +0.27 |
| StanfordCars | Base Acc. | 79.53 | 78.87 | 78.03 | 78.27 | −1.26 |
| | Novel Acc. | 71.47 | 74.60 | 74.87 | 74.97 | +3.50 |
| | H.M | 75.28 | 76.68 | 76.42 | 76.58 | +1.30 |

TABLE 12-continued

Detailed performance comparison on individual datasets for showing effect of individual components in PromptSRC approach. Absolute gains of PromptSCR (IVLP + $\mathcal{L}_{SCL}$ + GPA + Textual diversity) over the IVLP are shown in blue.

| Dataset | | IVLP | +$\mathcal{L}_{SCL}$ | +GPA | +Textual diversity | Δ |
|---|---|---|---|---|---|---|
| Flowers102 | Base Acc. | 97.97 | 97.97 | 98.00 | 98.07 | +0.10 |
| | Novel Acc. | 72.10 | 76.90 | 77.10 | 76.50 | +4.40 |
| | H.M | 83.07 | 86.17 | 86.30 | 85.95 | +2.88 |
| Food101 | Base Acc. | 89.37 | 90.37 | 90.57 | 90.67 | +1.30 |
| | Novel Acc. | 90.30 | 91.23 | 91.47 | 91.53 | +1.23 |
| | H.M | 89.83 | 90.80 | 91.02 | 91.10 | +1.27 |
| FGVCAircraft | Base Acc. | 42.60 | 42.33 | 42.30 | 42.73 | +0.13 |
| | Novel Acc. | 25.23 | 35.60 | 36.83 | 37.87 | +12.6 |
| | H.M | 31.69 | 38.67 | 39.38 | 40.15 | +8.46 |
| SUN397 | Base Acc. | 81.60 | 82.53 | 82.57 | 82.67 | +1.07 |
| | Novel Acc. | 75.50 | 78.70 | 78.83 | 78.47 | +2.97 |
| | H.M | 78.43 | 80.57 | 80.66 | 80.52 | +2.08 |
| DTD | Base Acc. | 82.40 | 83.13 | 82.97 | 83.37 | +0.97 |
| | Novel Acc. | 56.20 | 61.90 | 62.00 | 62.97 | +6.77 |
| | H.M | 66.82 | 70.96 | 70.97 | 71.75 | +4.92 |
| EuroSAT | Base Acc. | 96.73 | 93.07 | 93.50 | 92.90 | −3.83 |
| | Novel Acc. | 67.83 | 69.30 | 69.93 | 73.90 | +6.07 |
| | H.M | 79.74 | 79.45 | 80.02 | 82.32 | +2.58 |
| UCF101 | Base Acc. | 85.93 | 87.10 | 87.07 | 87.10 | +1.17 |
| | Novel Acc. | 74.17 | 79.73 | 79.80 | 78.80 | +4.63 |
| | H.M | 79.62 | 83.25 | 83.28 | 82.74 | +3.12 |

C. Additional Ablation Study

On Variants of Textual diversity: The method for achieving textual diversity involves using an ensemble of frozen CLIP textual features obtained through multiple text augmentations. Here, an analysis is provided of an alternate approach for incorporating textual diversity. Instead of using an ensemble, a single prompt template is chosen at random from N available templates to generate frozen CLIP textual features. The results averaged over 11 datasets, are shown in Table 10. However, it is observed that PromptSRC with the ensembled textual diversity technique outperforms the alternate approach. This suggests that using an ensemble of frozen CLIP features encourages the learning of more diverse prompt representations.

Below, detailed ablation experiments are conducted on the ImageNet validation set to analyze the effect of prompt token length, GPA hyper-parameters, and the number of textual templates (N) on the final performance.

Figures 5A, 5B:
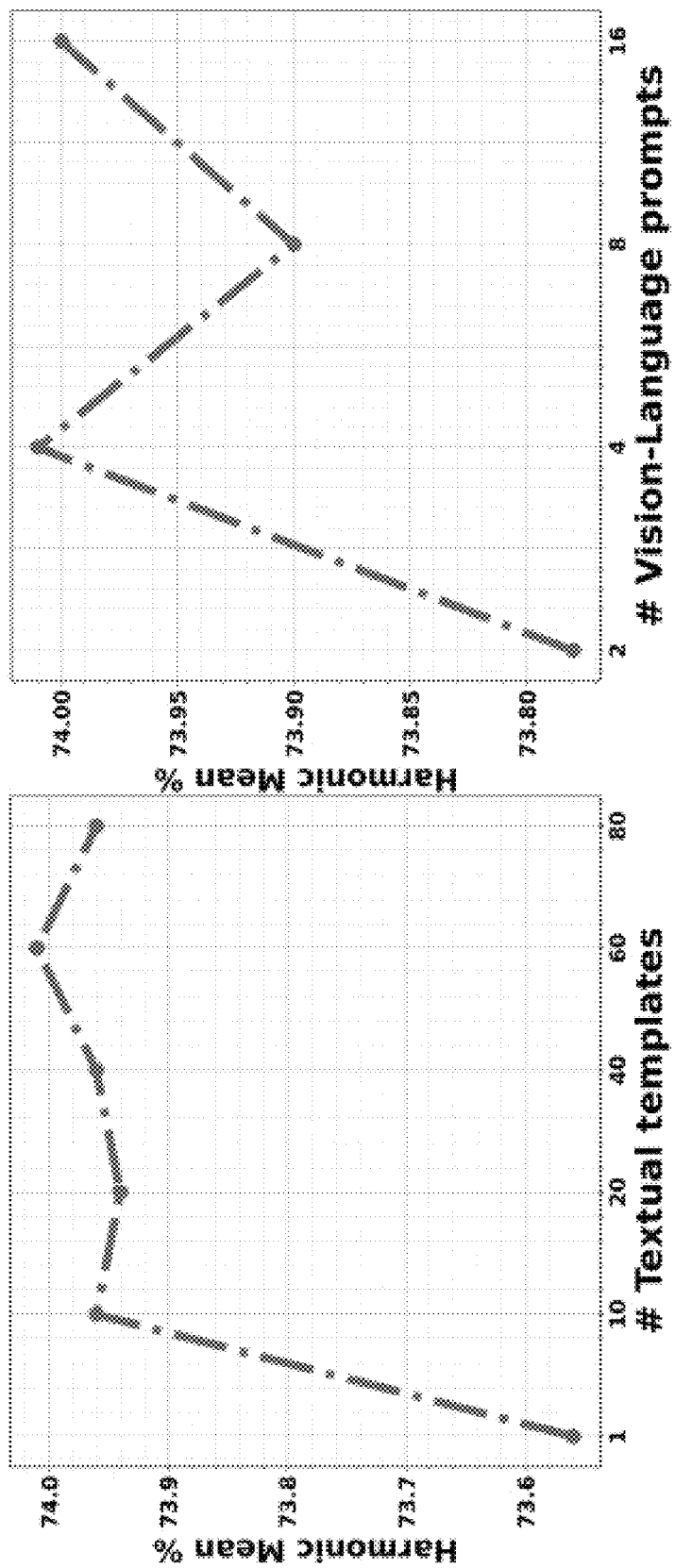
FIG. 5A is a graph of harmonic mean vs. textual templates.
FIG. 5B is a graph of harmonic mean vs. vision language prompts.

Prompt Length: FIG. 5B shows the effect of prompt token length on the harmonic mean. Overall, the performance increases as the prompt length increases. Using 4 vision-language prompts provides the highest harmonic mean.

Figures 6A, 6B:
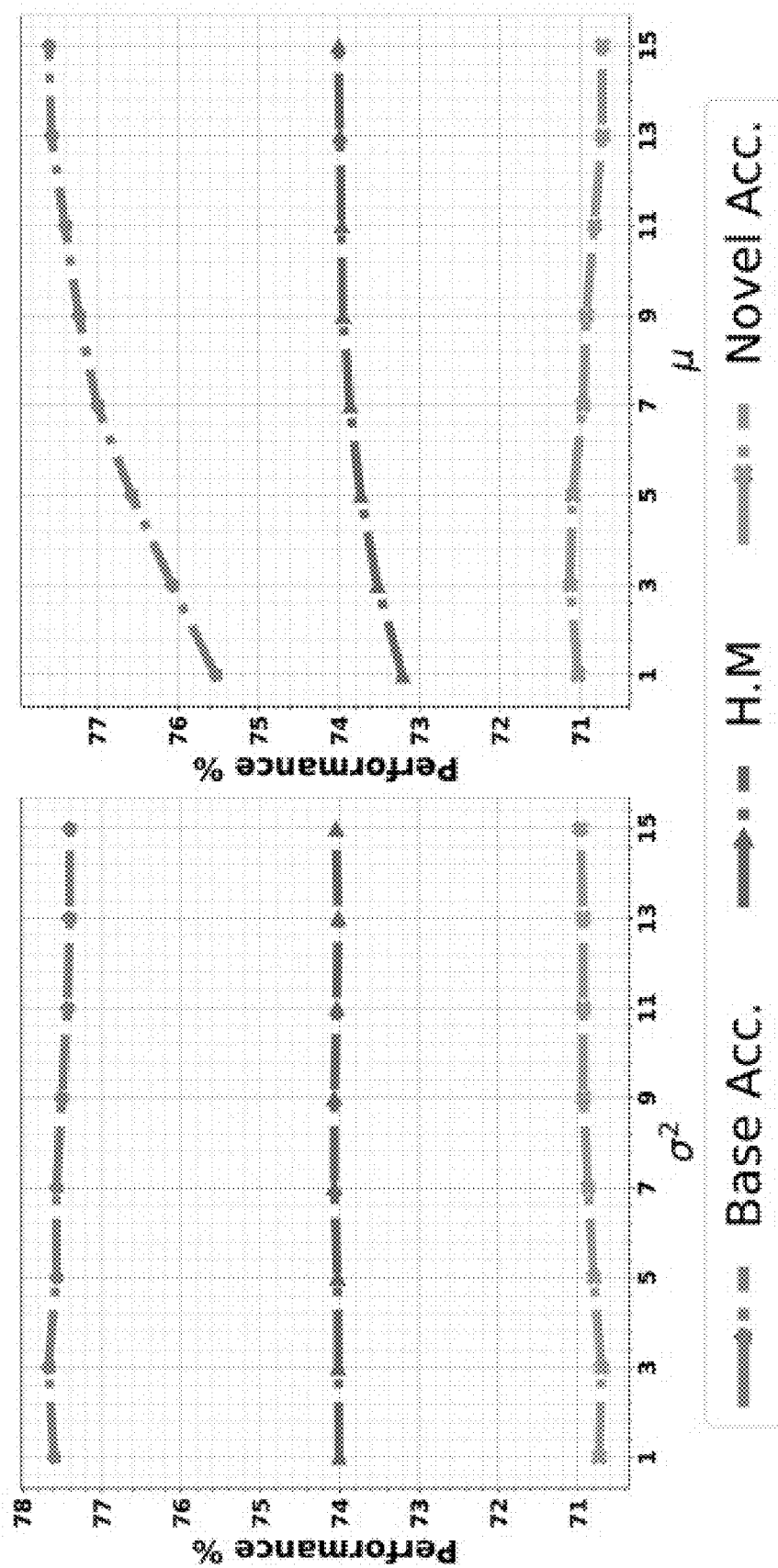
FIG. 6A is a graph of the effect of µ hyper-parameter of GPA on ImageNet dataset.
FIG. 6B is a graph of the effect of $\sigma^2$ hyper-parameter of GPA on ImageNet dataset.

GPA hyper-parameters: Ablation is conducted on μ and $\sigma^2$ hyper-parameters of GPA for the ImageNet dataset and show the results in FIGS. 6A, 6B. Overall, varying $\sigma^2$ has a minute effect on performance. On the other hand, as μ is increased, GPA provides more weights to prompts learned in the latter epochs which increases the base class performance and slightly decreases the novel class performance.

No. of templates in textual diversity: In FIG. 5A, the number of text prompt templates is ablated for textual diversity. Note that increasing the number of textual templates for textual diversity generally increases the performance. This suggests that adding textual diversity using multiple templates for pre-trained features provides more rich supervision for the learned prompted features.

Few-shot experiments: Table 13 shows the detailed per-dataset results of various methods in the few-shot setting. Overall, PromptSRC achieves consistent improvements over existing methods for all shots.

TABLE 13

Per-dataset performance comparison of PromptSRC with various methods in few-shot setting.

| Dataset | Method | 1 shot | 2 shots | 4 shots | 8 shots | 16 shots |
|---|---|---|---|---|---|---|
| ImageNet | Linear probe CLIP | 32.13 | 44.88 | 54.85 | 62.23 | 67.31 |
| | CoOp | 66.33 | 67.07 | 68.73 | 70.63 | 71.87 |
| | CoCoOp | 69.43 | 69.78 | 70.39 | 70.63 | 70.83 |
| | MaPLe | 62.67 | 65.10 | 67.70 | 70.30 | 72.33 |
| | PromptSRC (Ours) | 68.13 | 69.77 | 71.07 | 72.33 | 73.17 |
| Caltech101 | Linear probe CLIP | 79.88 | 89.01 | 92.05 | 93.41 | 95.43 |
| | CoOp | 92.60 | 93.07 | 94.40 | 94.37 | 95.57 |
| | CoCoOp | 93.83 | 94.82 | 94.98 | 95.04 | 95.16 |
| | MaPLe | 92.57 | 93.97 | 94.43 | 95.20 | 96.00 |
| | PromptSRC (Ours) | 93.67 | 94.53 | 95.27 | 95.67 | 96.07 |
| DTD | Linear probe CLIP | 34.59 | 40.76 | 55.71 | 63.46 | 69.96 |
| | CoOp | 50.23 | 53.60 | 58.70 | 64.77 | 69.87 |
| | CoCoOp | 48.54 | 52.17 | 55.04 | 58.89 | 63.04 |
| | MaPLe | 52.13 | 55.50 | 61.00 | 66.50 | 71.33 |
| | PromptSRC (Ours) | 56.23 | 59.97 | 65.53 | 69.87 | 72.73 |
| EuroSAT | Linear probe CLIP | 49.23 | 61.98 | 77.09 | 84.43 | 87.21 |
| | CoOp | 54.93 | 65.17 | 70.80 | 78.07 | 84.93 |

TABLE 13-continued

Per-dataset performance comparison of PromptSRC with various methods in few-shot setting.

| Dataset | Method | 1 shot | 2 shots | 4 shots | 8 shots | 16 shots |
|---|---|---|---|---|---|---|
| | CoCoOp | 55.33 | 46.74 | 65.56 | 68.21 | 73.32 |
| | MaPLe | 71.80 | 78.30 | 84.50 | 87.73 | 92.33 |
| | PromptSRC (Ours) | 73.13 | 79.37 | 86.30 | 88.80 | 92.43 |
| StanfordCars | Linear probe CLIP | 35.66 | 50.28 | 63.38 | 73.67 | 80.44 |
| | CoOp | 67.43 | 70.50 | 74.47 | 79.30 | 83.07 |
| | CoCoOp | 67.22 | 68.37 | 69.39 | 70.44 | 71.57 |
| | MaPLe | 66.60 | 71.60 | 75.30 | 79.47 | 83.57 |
| | PromptSRC (Ours) | 69.40 | 73.40 | 77.13 | 80.97 | 83.83 |
| Flowers102 | Linear probe CLIP | 69.74 | 85.07 | 92.02 | 96.10 | 97.37 |
| | CoOp | 77.53 | 87.33 | 92.17 | 94.97 | 97.07 |
| | CoCoOp | 72.08 | 75.79 | 78.40 | 84.30 | 87.84 |
| | MaPLe | 83.30 | 88.93 | 92.67 | 95.80 | 97.00 |
| | PromptSRC (Ours) | 85.93 | 91.17 | 93.87 | 96.27 | 97.60 |
| FGVCAircraft | Linear probe CLIP | 19.61 | 26.41 | 32.33 | 39.35 | 45.36 |
| | CoOp | 21.37 | 26.20 | 30.83 | 39.00 | 43.40 |
| | CoCoOp | 12.68 | 15.06 | 24.79 | 26.61 | 31.21 |
| | MaPLe | 26.73 | 30.90 | 34.87 | 42.00 | 48.40 |
| | PromptSRC (Ours) | 27.67 | 31.70 | 37.47 | 43.27 | 50.83 |
| SUN397 | Linear probe CLIP | 41.58 | 53.70 | 63.00 | 69.08 | 73.28 |
| | CoOp | 66.77 | 66.53 | 69.97 | 71.53 | 74.67 |
| | CoCoOp | 68.33 | 69.03 | 70.21 | 70.84 | 72.15 |
| | MaPLe | 64.77 | 67.10 | 70.67 | 73.23 | 75.53 |
| | PromptSRC (Ours) | 69.67 | 71.60 | 74.00 | 75.73 | 77.23 |
| OxfordPets | Linear probe CLIP | 44.06 | 58.37 | 71.17 | 78.36 | 85.34 |
| | CoOp | 90.37 | 89.80 | 92.57 | 91.27 | 91.87 |
| | CoCoOp | 91.27 | 92.64 | 92.81 | 93.45 | 93.34 |
| | MaPLe | 89.10 | 90.87 | 91.90 | 92.57 | 92.83 |
| | PromptSRC (Ours) | 92.00 | 92.50 | 93.43 | 93.50 | 93.67 |
| UCF101 | Linear probe CLIP | 53.66 | 65.78 | 73.28 | 79.34 | 82.11 |
| | CoOp | 71.23 | 73.43 | 77.10 | 80.20 | 82.23 |
| | CoCoOp | 70.30 | 73.51 | 74.82 | 77.14 | 78.14 |
| | MaPLe | 71.83 | 74.60 | 78.47 | 81.37 | 85.03 |
| | PromptSRC (Ours) | 74.80 | 78.50 | 81.57 | 84.30 | 86.47 |
| Food101 | Linear probe CLIP | 43.96 | 61.51 | 73.19 | 79.79 | 82.90 |
| | CoOp | 84.33 | 84.40 | 84.47 | 82.67 | 84.20 |
| | CoCoOp | 85.65 | 86.22 | 86.88 | 86.97 | 87.25 |
| | MaPLe | 80.50 | 81.47 | 81.77 | 83.60 | 85.33 |
| | PromptSRC (Ours) | 84.87 | 85.70 | 86.17 | 86.90 | 87.5 |
| Average | Linear probe CLIP | 45.83 | 57.98 | 68.01 | 74.47 | 78.79 |
| | CoOp | 67.56 | 70.65 | 74.02 | 76.98 | 79.89 |
| | CoCoOp | 66.79 | 67.65 | 71.21 | 72.96 | 74.90 |
| | MaPLe | 69.27 | 72.58 | 75.37 | 78.89 | 81.79 |
| | PromptSRC (Ours) | 73.32 | 75.29 | 78.35 | 80.69 | 82.87 |

Figure 10:
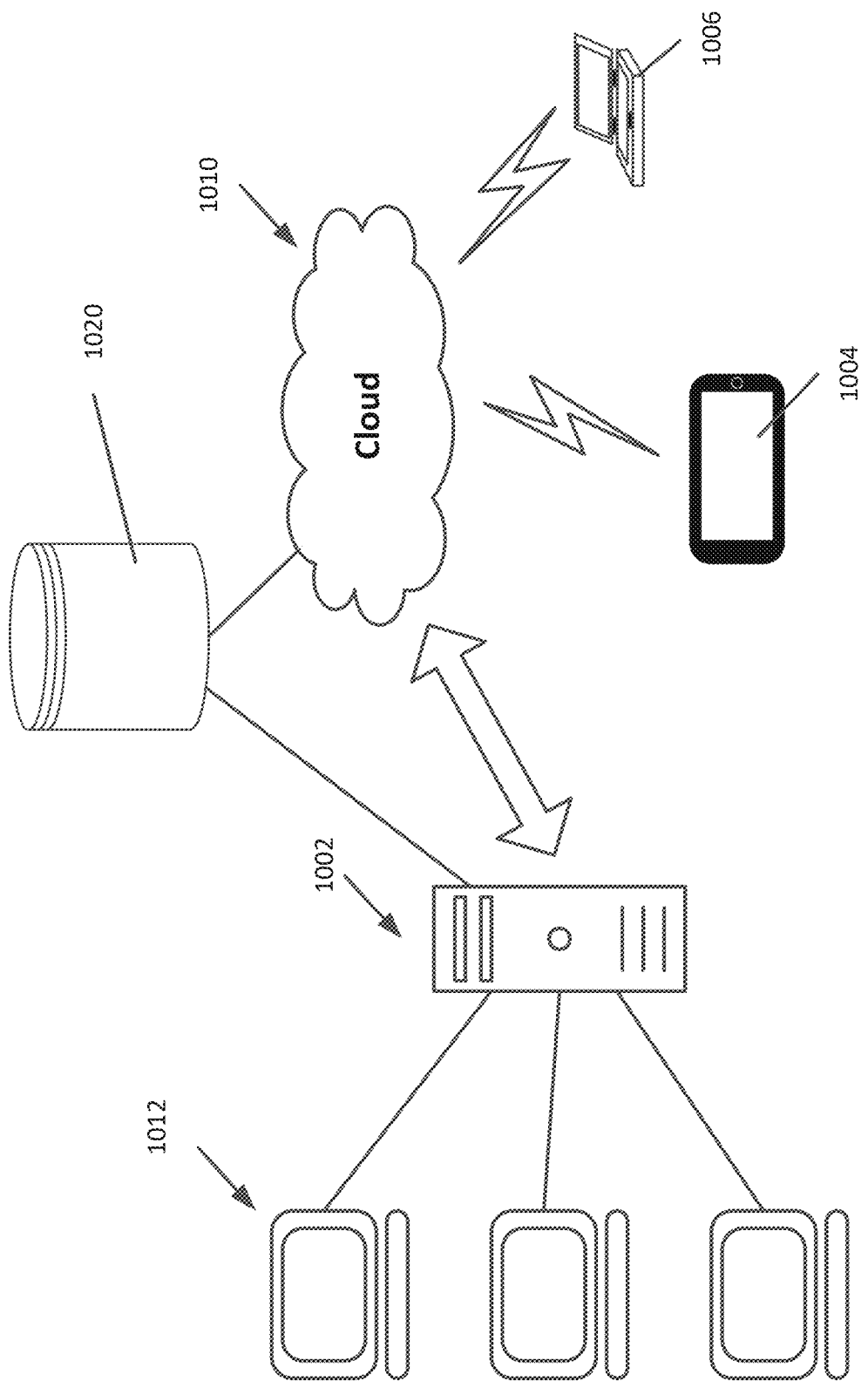
FIG. 10 is a system diagram of a training system for machine learning models.

FIG. 10 is a diagram of a machine learning system in accordance with an exemplary aspect of the disclosure. In an exemplary embodiment, a server 1002 or artificial intelligence (AI) workstation may be configured for Image recognition. With such a configuration, one or more client computers 1012 may be used to perform Image recognition for several videos or images at a time. In the embodiment, the server 1002 may be connected to a cloud service 1010. The cloud service 1010 may be accessible via the Internet. The cloud service 1010 may provide a database system, may maintain photographic images, and may serve streaming video. Mobile devices 1004, 1006 may access video or images served by the cloud service 1010.

An aspect is a vision-language machine learning training service having one or more servers 1002 and one or more client computers 1012. The vision-language service can insert a label that identifies a class of the video or image, so that viewers are aware of what the video or image shows.

Another aspect is a vision-language training software application for training vision-language learning models for various downstream tasks. The downstream tasks can include vision-language tasks, such as Visual Question Answering (VQA), image captioning, and Text-To-Image search. The vision-language training software application may be configured to run in the background as a daemon, or be configured to be invoked by a command and/or function associated with a graphical widget. In addition, videos or images that have been labeled may be stored in a database 1020 containing annotated videos or images. The database 1020 may be maintained in a server computer or in a cloud service 1010.

In some embodiments, a vision-language training service may include an image captioning system. The vision-language training system may perform an operation of detecting certain classes of videos or images, or take some other action based on a setup function of the streaming service. The streaming service may be setup to add captioning to videos or images, store labeled videos or images in a separate distribution channel, "Identified Video Channel" or other action under the discretion of the video streaming service.

In some embodiments, the vision-language system of the present disclosure may take the form of a product, such as an image detector device or software application. The Image detector device or software application may be connected to a streaming service 1010 and may capture video distributed by the streaming service in order to identify the video to be streamed. The vision-language device or software application may be incorporated into a network system as middleware that is connected between a video streaming service 1010 and an end user display device 1004, 1006. Videos that are detected may be subjected to a follow-up action, such as inserting a label into the video. Another action may be to redirect those videos detected as including certain classes into a database 1020. storing annotated videos, for example, to be further analyzed, or separately distributed in a video channel. A further action may be to block certain videos from being broadcast by the streaming service.

In some embodiments, a vision-language detector may be a mobile application that can be installed in a mobile display device 1004, 1006. The Image detector mobile application may inform the user of the mobile display device that a video contains images of certain classes, by for example, displaying an indication message, or outputting an audio sound or voice message, in order to make the user aware that a video being streamed has been detected as being for a certain class.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A method of adapting a vision-language (VL) machine learning model from a pre-trained VL model, the pre-trained VL model including a pre-trained image encoder and a pre-trained textual encoder, wherein the method is computer program implemented on a machine learning engine on which the pre-trained VL model is implemented, the method comprising:
   inputting a plurality of images for N image classes, where at least one class contains K image samples, where K is a number less than 20 and dividing each image into input image tokens;
   appending learnable text and image prompt tokens with input text tokens and the image input tokens, respectively, to obtain prompted text tokens and prompted image tokens;
   in parallel, generating from the prompted image tokens, via the pre-trained image encoder, prompted image features, and, via the pretrained textual encoder, prompted textual features from the prompted text tokens;
   determining, using the machine learning engine, a cross-entropy loss from the prompted image features and the prompted textual features;
   in parallel, generating from the input image tokens, via the pre-trained image encoder, pre-trained image features, and via the pre-trained text encoder, pre-trained textual features from the input text tokens;
   determining, using the machine learning engine, a self-regularizing consistency loss from the prompted image features, the pre-trained image features, the prompted textual features, and the pre-trained textual features; and
   updating the learnable text and image prompt tokens based on the cross-entropy loss in combination with the self-regularizing consistency loss,
   wherein the updating with the self-regularizing consistency loss is constrained to maximize mutual agreement between the prompted image and textual features and the pre-trained image and textual features.

2. The method of claim 1, further comprising
   inferencing, by the machine learning engine, for image classification using ensembled visual and textual prompts.

3. The method of claim 1, wherein the updating further includes
   employing Mutual Agreement Maximization constraints to regulate the learnable text and image prompt tokens by aligning the prompted image features with the pre-trained image features and the prompted textual features with the pre-trained textual features.

4. The method of claim 3, wherein the Mutual Agreement Maximization constraints further includes a logit level self-consistency regularization.

5. The method of claim 4, wherein the Mutual Agreement Maximization further includes conditioning a prompted logits distribution on a pre-trained logits distribution.

6. The method of claim 3, wherein the Mutual Agreement Maximization further includes
   using a pool of textual prompt templates, containing M augmentations, to form multiple pre-trained textual features per class.

7. The method of claim 6, wherein the Mutual Agreement Maximization further includes aligning the prompted textual features with the multiple pre-trained textual features.

8. The method of claim 1, wherein the updating includes
   performing prompt self-ensembling to combine strengths of the learnable text and image prompt tokens learned at different epochs during the updating via Gaussian weighted sampling.

9. The method of claim 8, wherein the updating via Gaussian weighted sampling includes performing Gaussian weighted prompt aggregation (GPA), where small aggregation weights are given to prompts at initial epochs, weights higher than the small aggregation weights are given to prompts at middle epochs, and weights that are relatively lower than the higher weights are given to prompts at final epochs, to obtain optimal learnable text and image prompt tokens.

10. The method of claim 1, further comprising inferencing, by the machine learning engine, for object detection using ensembled visual and textual prompts.

11. A non-transitory computer-readable storage medium storing a pre-trained vision-language (VL) model, the pre-trained VL model including a pre-trained image encoder and a pre-trained textual encoder, the computer-readable storage medium including computer executable instructions, wherein the instructions, when executed by a machine learning (ML) engine, cause the ML engine to perform a method for adapting a VL machine learning model from the pre-trained VL model, the method comprising:
   inputting a plurality of images for N image classes, where at least one class contains K image samples, where K is a number less than 20 and dividing each image into input image tokens;
   appending learnable text and image prompt tokens with input text tokens and the image input tokens, respectively, to obtain prompted text tokens and prompted image tokens;
   in parallel, generating from the prompted image tokens, via the pre-trained image encoder, prompted image features, and, via the pretrained textual encoder, prompted textual features from the prompted text tokens;
   determining, using the machine learning engine, a cross-entropy loss from the prompted image features and the prompted textual features;

in parallel, generating from the input image tokens, via the pre-trained image encoder, pre-trained image features, and via the pre-trained text encoder, pre-trained textual features from the input text tokens;

determining, using the machine learning engine, a self-regularizing consistency loss from the prompted image features, the pre-trained image features, the prompted textual features, and the pre-trained textual features; and updating the learnable text and image prompt tokens based on the cross-entropy loss in combination with the self-regularizing consistency loss, wherein the updating with the self-regularizing consistency loss is constrained to maximize mutual agreement between the prompted image and textual features and the pre-trained image and textual features.

12. The computer-readable storage medium of claim 11, further comprising a classifier layer, further comprising inferencing, by the machine learning engine, using ensembled visual and textual prompts, and classifying an image by the classifier layer.

13. The computer-readable storage medium of claim 11, wherein the updating further includes employing Mutual Agreement Maximization constraints to regulate the learnable text and image prompt tokens by aligning the prompted image features with the pre-trained image features and the prompted textual features with the pre-trained textual features.

14. The computer-readable storage medium of claim 13, wherein the Mutual Agreement Maximization constraints further includes a logit level self-consistency regularization.

15. The computer-readable storage medium of claim 14, wherein the Mutual Agreement Maximization further includes conditioning a prompted logits distribution on a pre-trained logits distribution.

16. The computer-readable storage medium of claim 13, wherein the Mutual Agreement Maximization further includes using a pool of textual prompt templates, containing M augmentations, to form multiple pre-trained textual features per class.

17. The computer-readable storage medium of claim 16, wherein the Mutual Agreement Maximization further includes aligning the prompted textual features with the multiple pre-trained textual features.

18. The computer-readable storage medium of claim 11, wherein the updating includes performing prompt self-ensembling to combine strengths of the learnable text and image prompt tokens learned at different epochs during the updating via Gaussian weighted sampling.

19. The computer-readable storage medium of claim 18, wherein the updating via Gaussian weighted sampling includes performing Gaussian weighted prompt aggregation (GPA), where small aggregation weights are given to prompts at initial epochs, weights higher than the small aggregation weights are given to prompts at middle epochs, and weights that are relatively lower than the higher weights are given to prompts at final epochs, to obtain optimal learnable text and image prompt tokens.

20. The computer-readable storage medium of claim 11, further comprising a classifier layer and a bounding box regression layer, further comprising inferencing, by the machine learning engine, using ensembled visual and textual prompts, and classifying an object in an image by the classifier layer and the bounding box regression layer.

* * * * *